US012645051B2

(12) United States Patent
Kowal et al.

(10) Patent No.: US 12,645,051 B2
(45) Date of Patent: Jun. 2, 2026

(54) LARGE ANGLE COMPACT OPTICAL IMAGE STABILIZATION FOR FOLDED CAMERAS

(71) Applicant: Corephotonics Ltd., Tel Aviv (IL)

(72) Inventors: Yiftah Kowal, Tel Aviv (IL); Ephraim Goldenberg, Tel Aviv (IL); Tom Weitz, Tel Aviv (IL); Oriel Grushka, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/858,827

(22) PCT Filed: Feb. 8, 2024

(86) PCT No.: PCT/IB2024/051156
§ 371 (c)(1),
(2) Date: Oct. 22, 2024

(87) PCT Pub. No.: WO2024/171004
PCT Pub. Date: Aug. 22, 2024

(65) Prior Publication Data
US 2025/0362477 A1     Nov. 27, 2025

Related U.S. Application Data

(60) Provisional application No. 63/515,593, filed on Jul. 26, 2023, provisional application No. 63/485,071, filed on Feb. 15, 2023.

(51) Int. Cl.
*G02B 27/64*     (2006.01)
*G02B 7/182*     (2021.01)

(52) U.S. Cl.
CPC ......... *G02B 7/1827* (2013.01); *G02B 27/646* (2013.01)

(58) Field of Classification Search
CPC .... G02B 7/1827; G02B 27/646; G02B 27/64; G02B 7/18; G02B 7/1822; G02B 7/1828;
(Continued)

(56) References Cited

U.S. PATENT DOCUMENTS 3,085,354 A     4/1963   Rasmussen et al.
3,584,513 A     6/1971   Gates
(Continued)

FOREIGN PATENT DOCUMENTS

CN       111936908 A   *  11/2020   ............. H04N 23/57
WO       2022118176 A1     6/2022
WO       2022200965 A1     9/2022

OTHER PUBLICATIONS

International Search Report and Written Opinion in related PCT application PCT/IB2024/051156, dated Apr. 17, 2024.
(Continued)

*Primary Examiner* — Arnel C Lavarias

(74) *Attorney, Agent, or Firm* — Nathan & Associates; Menachem Nathan

(57)     ABSTRACT

Folded scanning zoom cameras comprising an optical path folding element (OPFE) and an OPFE actuator operative to rotate the OPFE around a first rotation axis and around a second rotation axis that is perpendicular to the first rotation axis to perform optical image stabilization (OIS) by more than ±1 degrees around respectively, a first OIA direction and a second OIS direction.

41 Claims, 21 Drawing Sheets

(58) Field of Classification Search
CPC ........ G02B 7/182; H04N 23/57; H04N 23/68;
H04N 23/682; H04N 23/685; H02K
41/0354; H02K 41/0358; G03B 2217/005;
G03B 2205/00; G03B 2205/0007; G03B
2205/0023; G03B 2205/0053; G03B
2205/0069; G03B 13/36
USPC ....... 359/555, 554; 250/201.1, 201.2, 201.4;
348/208.99, 208.2, 208.12; 396/52, 55
See application file for complete search history.

(56) References Cited

U.S. PATENT DOCUMENTS

| | | | |
|---|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0189849 A1 | 9/2004 | Hofer et al. |
| 2004/0227838 A1 | 11/2004 | Atarashi et al. |

(56) References Cited

U.S. PATENT DOCUMENTS

| | | |
|---|---|---|
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |

(56)  References Cited

U.S. PATENT DOCUMENTS

| | | |
|---|---|---|
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0294002 A1 | 10/2017 | Jia et al. |
| 2017/0329111 A1 | 11/2017 | Hu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0217475 A1* | 8/2018 | Goldenberg ............. G03B 3/10 |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0049687 A1* | 2/2019 | Bachar ............... H02K 41/0354 |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2020/0400464 A1* | 12/2020 | Yedid ..................... H04N 23/58 |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0252963 A1 | 8/2022 | Shabtay et al. |
| 2022/0368814 A1 | 11/2022 | Topliss et al. |
| 2023/0039197 A1 | 2/2023 | Boltanski |

OTHER PUBLICATIONS

Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7um Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.

(56)         References Cited

OTHER PUBLICATIONS

Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Zitova Bet Al: "Image Registration Methods: a Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: 10_i0i6/ S0262-8856(03)00137-9.
European Search Report in related EP patent application 25154528. 1, dated Apr. 24, 2025.

* cited by examiner

*KNOWN ART*

LARGE ANGLE COMPACT OPTICAL IMAGE STABILIZATION FOR FOLDED CAMERAS

CROSS REFERENCE TO RELATED APPLICATIONS

This is a 371 application from international patent application PCT/IB2024/051156 filed Feb. 8, 2024, which is related to and claims priority from U.S. Provisional Patent Applications 63/485,071 filed Feb. 15, 2023, 63/515,593 filed Jul. 26, 2023, and 63/580,998 filed Sep. 7, 2023, all of which are incorporated herein by reference in their entirety.

FIELD

Examples disclosed herein relate in general to digital cameras and in particular to optical stabilization of images obtained with folded digital cameras.

BACKGROUND

Compact digital cameras having folded optics and referred to as "folded cameras" are known, see e.g. co-owned international patent application PCT/IB2016/057366. In handheld mobile electronic devices (or simply "mobile devices") such as smartphones, tablets, etc., a folded Tele (T) camera (also referred to herein as "FTC") is often part of a multi-camera system and accompanied by one or more additional cameras, e.g. an Ultra-wide (UW) camera and/or a Wide (W) camera. An Ultra-wide camera has a larger field of view ($FOV_{UW}$) than that of a Wide camera ($FOV_W$), where $FOV_W$ is larger than a $FOV_T$ of a folded Tele camera.

FIG. 1A shows schematically a dual camera 100 as known in the art in a perspective view. Dual camera 100 includes a FTC 101 and a regular (or vertical) camera 130. FTC 101 includes an optical path folding element (OPFE) 102, an image sensor 106 and a lens (not shown) held in a lens barrel 110. The optical axis of the lens is marked 108. OPFE 102 is operational to fold a first optical path (OP1) 112 into a second optical path (OP2) 114, where OP2 114 is substantially parallel to the lens optical axis 108. Camera 130 may be a W camera or a UW camera. Camera 130 includes a lens 132 held in a lens barrel 134, and an image sensor 138. The optical axis of lens 132 is marked 136 and is oriented parallel to OP1 112. In the x-y-z coordinate axis shown, OP1 112 is oriented parallel to the y-axis and OP2 114 is oriented parallel to the z-axis.

Scanning zoom cameras ("SZ" cameras or "SZCs") are known, see e.g. co-owned international patent application PCT/IB2016/057366. FIG. 1B shows schematically a FOV 140 of a dual camera, which includes a $FOV_W$ 142 of a Wide camera and a $FOV_{SZ}$ 144 of a scanning zoom camera. As shown, $FOV_{SZ}$ 144 can scan (or move) within $FOV_W$ 142 in two dimensions, as indicated by four arrows. A compact and cost-effective way of implementing a SZC operational to scan two dimensions is to rotate (or "tilt") an OPFE (e.g. a prism) of a folded zoom camera along two rotation axes. However, this introduces "point of view (POV) aberrations", which must be corrected after capturing a respective SZC image, for example as detailed in the co-owned international patent application PCT/IB2021/056311. Overall, the presence of POV aberrations increases a dual camera's complexity and carries the risk of imperfect correction.

Modern cameras such as dual camera 100 in general include optical image stabilization (OIS) for mitigating undesired camera motion caused by a user's hand motion (often referred to as handshake). For OIS, optical components are moved to reduce movements of imaged objects on the camera's image sensor. In other words, a FOV is moved so that it is stabilized on the image sensor. Often, an OPFE such as OPFE 102 is moved for OIS with respect to the lens and to the image sensor ("prism OIS"). An inertial measurement unit (IMU) as known in the art and included in a mobile device including also dual camera 100 may provide motion data of the mobile device. For example, the motion data of the mobile device may be of 6 degrees of freedom. The motion data of the mobile device may be used for providing OIS. For OIS along a first ("Yaw") direction, OPFE 102 is rotated around a yaw rotation axis 112 which is parallel to OP1 112. For OIS along a second ("Pitch") direction, OPFE 102 is rotated around a pitch rotation axis 116 which is parallel to the x-axis and perpendicular to both OP1 112 and OP2 114. For improving the image quality of a folded camera such as folded camera 101 even in harsh scenarios such as relatively strong undesired camera motion, relatively large FOV movement of e.g. ±1 degree or more along the yaw direction and the pitch direction respectively are required. To provide the relatively large FOV movements, in general relatively large actuators and/or large camera modules are required.

There is a need for and it would be advantageous to have a large movement prism OIS actuator. In addition, it would be advantageous to have a dual camera including a SZC which does not create POV aberrations.

SUMMARY

In various exemplary embodiments there is provide a folded camera module, comprising: an OPFE for folding light from a first optical path toward a second optical path that is substantially orthogonal to the first optical path, a lens with a lens optical axis along the second optical path, the lens having an effective focal length EFL in the range of 5-40 mm; an image sensor; a module frame surrounding the folded camera module, the module frame having an inner wall pointing towards the OPFE, a module height $H_M$ measured along a direction parallel to the first optical path, a module length $L_M$ measured along a direction parallel to the second optical path and a module width $W_M$ measured along a direction perpendicular to both the first optical path and the second optical path; an OPFE actuator including a single voice coil motor (VCM) for rotating the OPFE around a first rotation axis and around a second rotation axis that is perpendicular to the first rotation axis to perform OIS around respectively, a first OIS direction and a second OIS direction, wherein the OIS is by more than ±1 degrees around each of the first OIS direction and the second OIS direction, wherein a minimum distance $Y_{Min}$ between the OPFE and the inner wall of the module frame in an extreme rotation OPFE position measured along a direction parallel to the second optical path fulfills $Y_{Min} \leq 2$ mm, wherein $Y_{Min}/L_M \leq 0.075$, wherein a minimum distance $X_{MIN}$ between the OPFE and the inner wall of the module frame in an extreme rotation OPFE position measured along a direction perpendicular to both the first optical path and the second optical path fulfills $X_{Min} \leq 3$ mm, and wherein $X_{Min}/W_M \leq 0.25$.

In some examples, the rotation of the OPFE around the first rotation axis uses three support positions.

In some examples, the first rotation axis is located within an area that also includes the OPFE.

In some examples, the second rotation axis is located within an area that also includes the OPFE.

In some examples, $Y_{Min}/L_M \leq 0.05$. In some examples, $X_{Min}/W_M$ is $\leq 0.2$. In some examples, $X_{Min} \leq 2.75$ mm and $Y_{Min} \leq 1.75$ mm. In some examples, $X_{Min} \leq 2.5$ mm and $Y_{Min} \leq 1.5$ mm. In some examples, $X_{Min} \leq 2.25$ mm and $Y_{Min} \leq 1.25$ mm.

In some examples, the OIS may be by more than ±2 degrees around each of the first OIS direction and the second OIS direction. In some examples, the OIS may be by more than ±3 degrees around each of the first OIS direction and the second OIS direction. In some examples, the OIS may be by more than ±4 degrees around each of the first OIS direction and the second OIS direction. In some examples, the OIS may be by more than ±5 degrees around each of the first OIS direction and the second OIS direction.

In some examples, the OPFE is a prism.

In some examples, $W_M$ may be in the range of 7.5-15 mm and $L_M$ may be in the range of 15-30 mm. In some examples, $H_M$ may be in the range of 4-15 mm. In some examples, $H_M$ may be in the range of 5-10 mm.

In some examples, the OPFE has an OPFE height $H_P$ measured along a direction parallel to the first optical path and an OPFE width $W_P$ measured along a direction perpendicular to both the first optical path and the second optical path, wherein in a zero-rotation OPFE position the OPFE is located at a horizontal distance h-$D_{PH}$ and at a vertical distance v-$D_{PH}$ away from the inner wall of the module frame, and wherein $W_P/\text{h-}D_{PH} > 1.75$ and $H_P/\text{v-}D_{PH} > 1.75$.

In some examples, $W_P/\text{h-}D_{PH} > 2$ and $H_P/\text{v-}D_{PH} > 2$. In some examples, $W_P/\text{h-}D_{PH} > 2.5$ and $H_P/\text{v-}D_{PH} > 2.5$. In some examples, $W_P/\text{h-}D_{PH} > 3$ and $H_P/\text{v-}D_{PH} > 3$. In some examples, $W_P/\text{h-}D_{PH} > 3.25$ and $H_P/\text{v-}D_{PH} > 3.25$.

In some examples, $H_M < H_P + 4$ mm. In some examples, $H_M < H_P + 2.5$ mm.

In some examples, a ratio $H_P/H_M$ may be in the range of 0.7-0.8.

In some examples, $W_P$ may be in the range of 3-20 mm.

In some examples, EFL may be in the range of 10-25 mm.

In some examples, the OPFE actuator includes a yaw stage, a pitch stage and a frame, and the yaw stage, the pitch stage and the frame move relatively to each other. In some examples, the pitch stage moves together with the yaw stage.

In some examples, the yaw stage includes two magnets, and the frame includes two coils, a first coil and a second coil. In some examples, the frame and the module frame are made of one part. In some examples, the yaw stage includes a position sensing unit comprising one or more magnets. In some examples, the pitch stage includes a position sensing unit comprising two or more magnets. In some examples, the relative movement between the yaw stage, the pitch stage and the frame is enabled by a plurality of ball bearings.

In some examples, for rotating the OPFE around the second rotation axis, a current in the first coil is flowing in an identical direction with a current in the second coil. In some examples, for rotating the OPFE around the first rotation axis, a current in the first coil is flowing in an opposite direction than a current in the second coil.

In some examples, the folded camera module may be included in a mobile device. In some examples, the mobile device also comprises a Wide camera having a Wide camera field of view $FOV_W$ larger than $FOV_T$. In some examples, the mobile device also comprises an IMU. In some examples, the mobile device may be a smartphone. In some examples, the mobile device may be a tablet.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

FIG. 9A shows the component shown in FIG. 6B in a first extreme rotation state with respect to a first rotation axis in a side view;

FIG. 9B shows the component shown in FIG. 6B in a center rotation state with respect to a first rotation axis in a side view;

FIG. 9C shows component shown in FIG. 6B in a second extreme rotation state with respect to a first rotation axis in a side view;

DETAILED DESCRIPTION

Figure 1A:
FIG. 1A shows schematically a known dual camera including a folded camera.
Figure 1A:
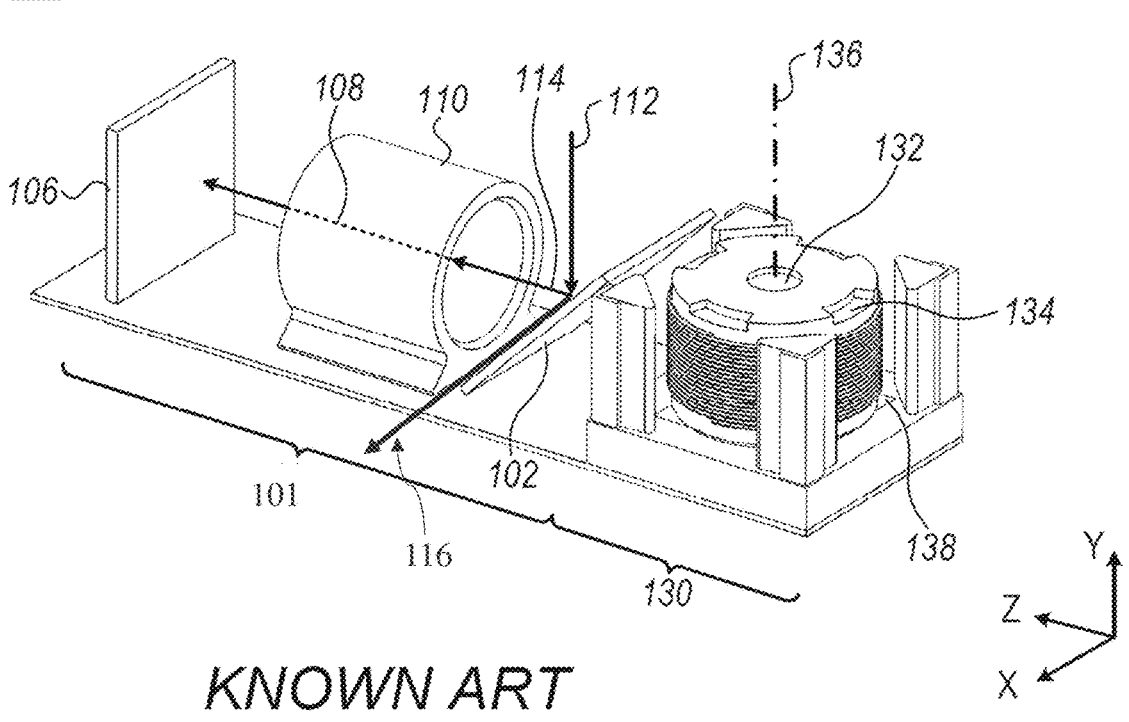
Figure 1B:
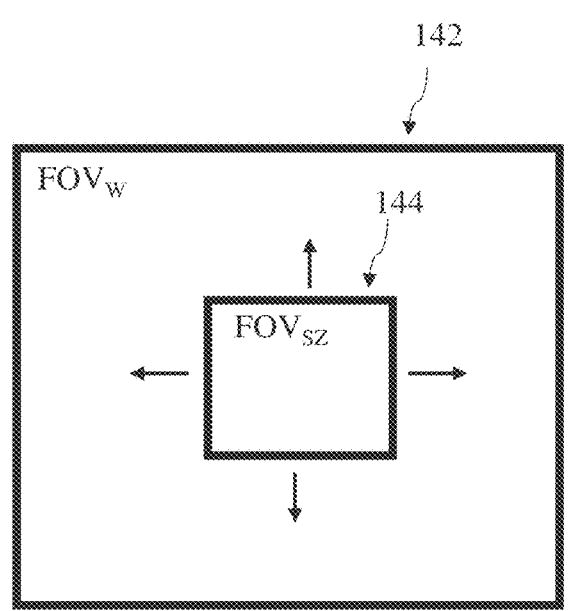
FIG. 1B shows schematically a known dual camera field-of-view including a folded scanning zoom camera field-of-view.
Figure 2A:
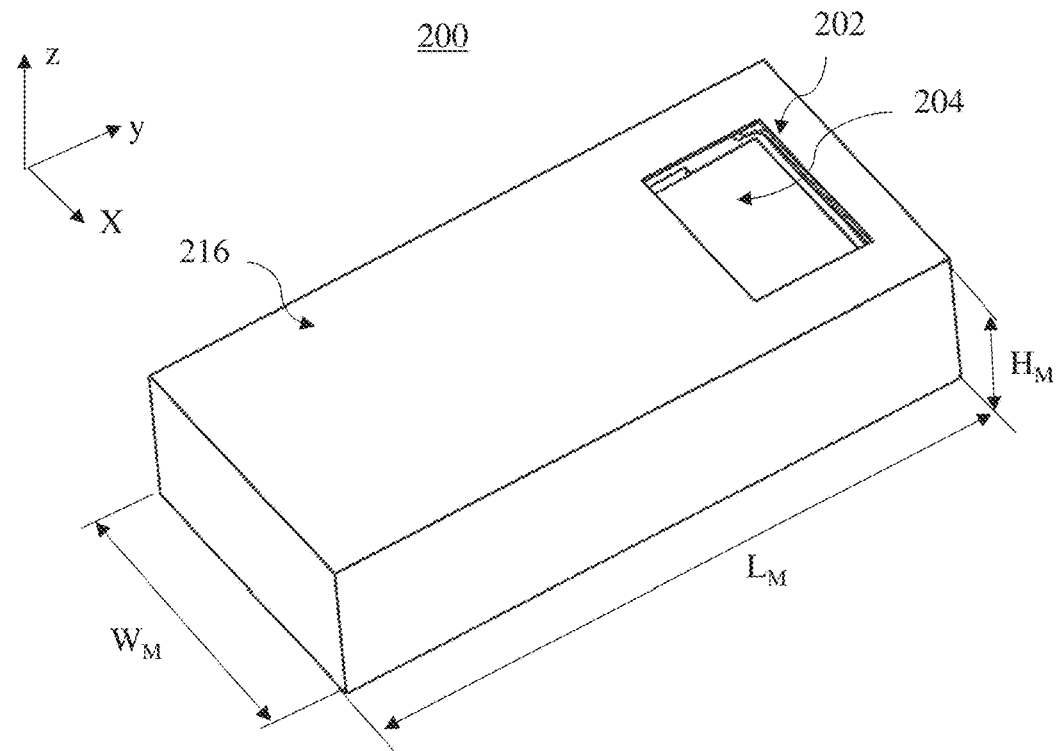
FIG. 2A shows a folded camera module including a folded camera operational for large stroke OIS as disclosed herein in a perspective view.
Figure 2B:
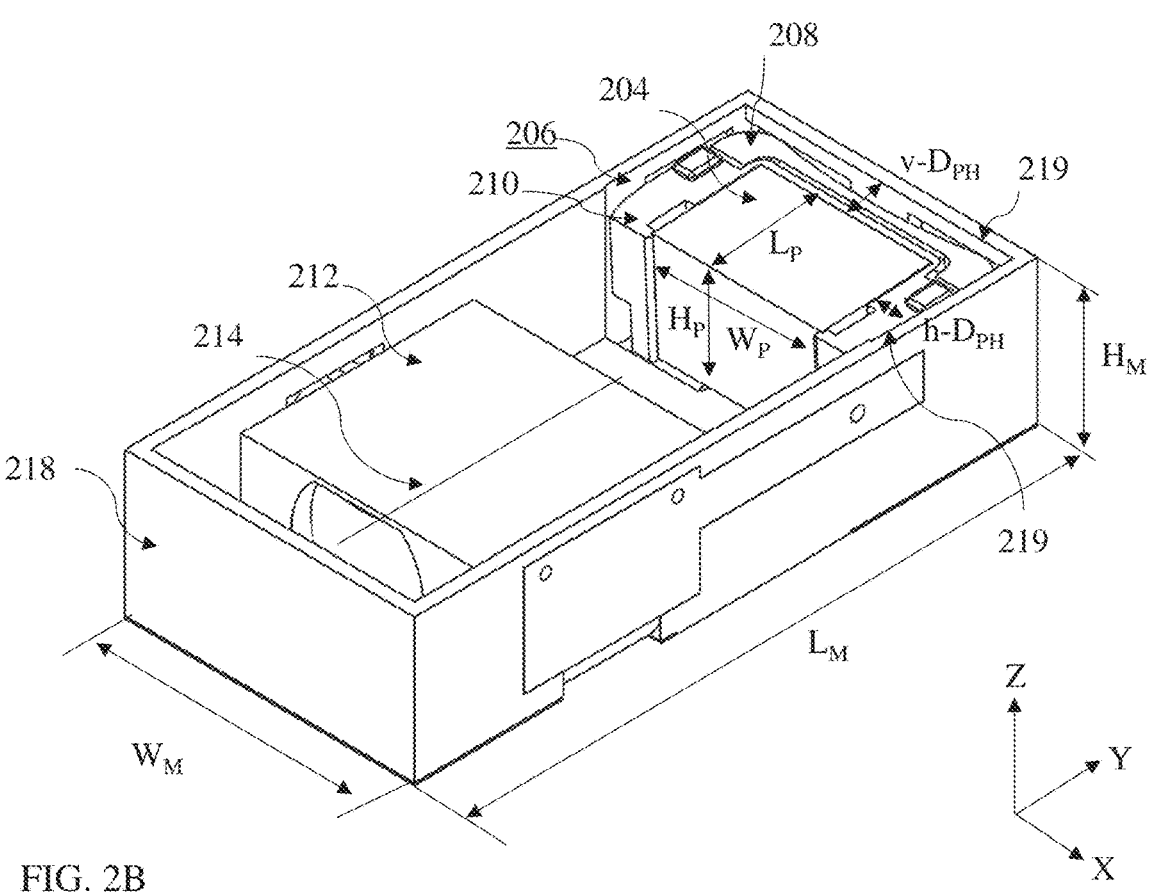
FIG. 2B shows the folded camera module of FIG. 2A without a top shield in the same view.
Figure 2C:
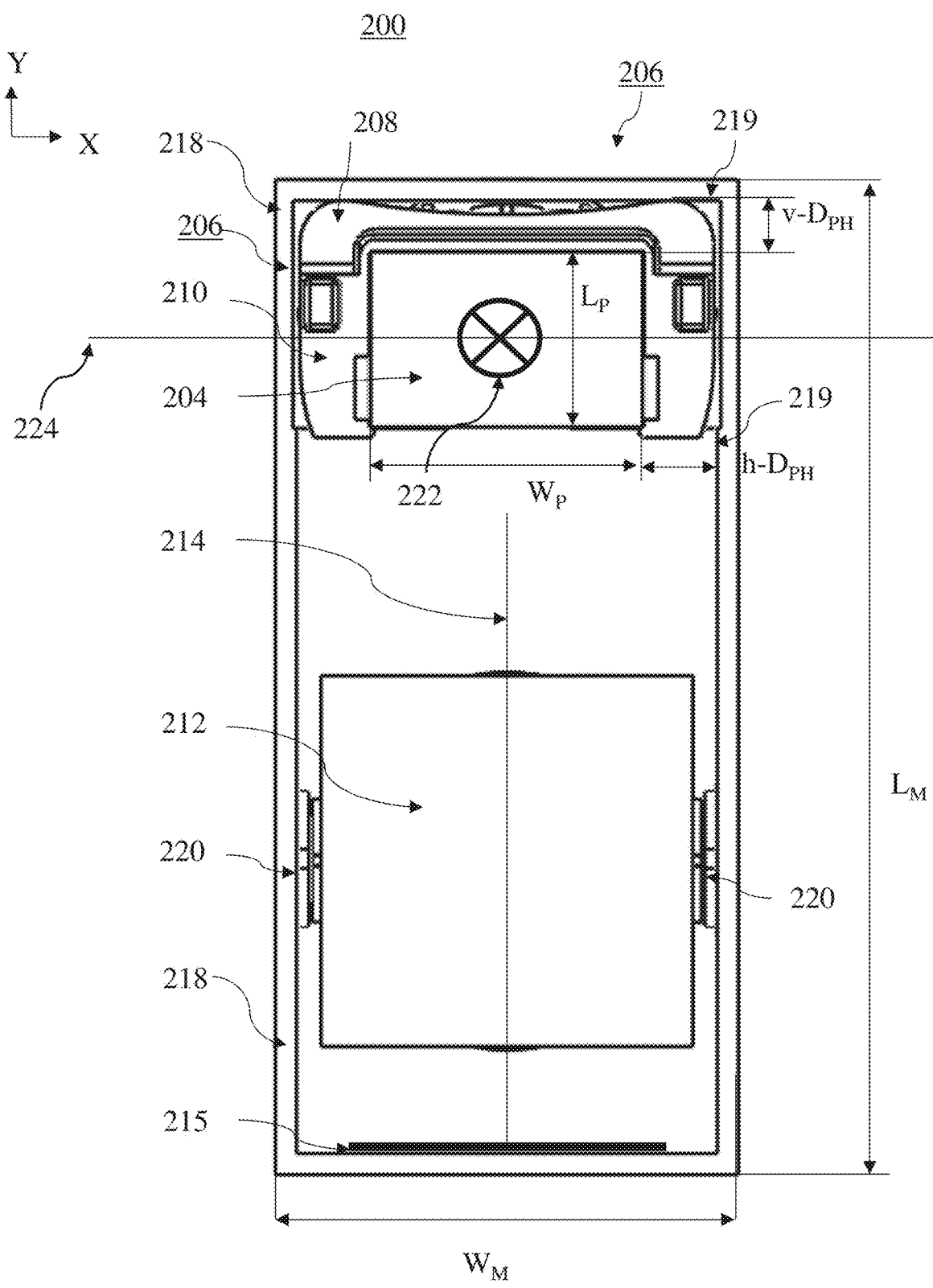
FIG. 2C shows the folded camera module of FIG. 2B in a top view.

FIG. 2A shows an embodiment of a folded camera module numbered 200 that comprises a folded camera operational for large stroke OIS as disclosed herein in a perspective view. Folded camera module 200 has an aperture 202 formed (or defined or determined) by an OPFE 204 included in an OPFE holder 206 (FIGS. 2B, C). Folded camera module 200 further includes a lens barrel 212 with a lens (not shown) having a lens optical axis 214, and an image sensor 215 (FIG. 2C). The lens may have an effective focal length ("EFL") in the range of 5 mm-40 mm, or in the range of 10 mm to 25 mm. Folded camera module 200 is covered by a top shield 216. A length $L_M$, a width $W_M$ and a height $H_M$ of folded camera module 200 are marked. Folded camera module 200 is operational to perform large stroke OIS by rotating prism 204 around a first, yaw rotation axis 222 and a second, pitch rotation axis 224 by ±1 degree or more. Rotating prism 204 around the two rotation axes can be used to achieve two effects:
1. To change the position of the FOV of the folded camera included in folded camera module 200, i.e. to scan a scene with the FOV of the folded camera.
2. To mitigate an undesired handshake of a mobile device that includes folded camera module 200 (around two axes).

FIG. 2B shows folded camera module 200 without top shield 216 in another perspective view. FIG. 2C shows folded camera module 200 without top shield 216 in a top view. Folded camera module 200 is surrounded by a module frame (or simply "frame" or "housing") 218. Frame 218 has two different functions: 1) acting as a bottom shield (or housing) of folded camera module 200, i.e. frame 218 surrounds large parts of camera components included in folded camera module 200; and 2) acting as a stationary part of OPFE holder 206, which engages with (or interacts with) a yaw stage and a pitch stage 210 for actuating OPFE 204 as described below. Frame 218 may for example be made of plastic. Here, OPFE 204 is a prism. In other examples, OPFE 204 may be a mirror. OPFE 204 has an OPFE (i.e. prism) length $L_P$, an OPFE width $W_P$ and an OPFE height $H_P$, as marked.

In FIGS. 2B-C, OPFE 204 is shown in a zero-rotation state. "Zero-rotation state" refers here to a state that represents (1) a center of a pitch rotation stroke defined by a minimum pitch rotation angle $Pitch_{Min}$ and by a maximum pitch rotation angle $Pitch_{Max}$, and (2) a center of a yaw rotation stroke defined by a minimum yaw rotation angle $Yaw_{Min}$ and a maximum pitch rotation angle $Yaw_{Max}$. In the zero-rotation state, "borders" (i.e. edges or surfaces) of OPFE 204 are oriented parallel to an inner wall (or surface) 219 of frame 218. In the zero-position, OPFE 204 is located at a "vertical" distance $v\text{-}D_{PH}$ and a "horizontal" distance $h\text{-}D_{PH}$ from inner wall 219 of frame 218, as shown. The same holds for all other borders mentioned.

With reference to FIG. 2C, "horizontal" refers here to the fact that $h\text{-}D_{PH}$ is measured along a horizontal direction (parallel to the x-axis in the x-y-z coordinate system shown), and "vertical" refers here to the fact that $v\text{-}D_{PH}$ is measured along a vertical direction (parallel to the y-axis). Yaw rotation axis 222 is oriented perpendicular to the coordinate system shown in FIG. 2C, and pitch rotation axis 224 is oriented parallel to the x-axis. Yaw rotation axis 222 is located (or positioned) within an area that also includes OPFE 204. Rotating OPFE 204 by 1 degree around yaw rotation axis 222 and pitch rotation axis 224 respectively moves the FOV of the folded camera by 1 degree in a yaw rotation direction and by 2 degrees in a pitch rotation direction, as known in the art. I.e., to achieve a FOV movement of angle α in both the yaw rotation direction and the pitch rotation direction, one rotates OPFE 204 by α around yaw rotation axis 222 and by 0.5×α around pitch rotation axis 224. Here, the FOV movement is to perform OIS.

For a compact camera, it is advantageous to minimize both $v\text{-}D_{PH}$ and $h\text{-}D_{PH}$. In some examples, folded camera module 200 and OPFE 204 may have the following dimensions:

$L_M$=29 mm, $W_M$=13.5 mm, and $H_M$=6.8 mm.

$L_P$=$H_P$=5 mm, $W_P$=7.8 mm.

$v\text{-}D_{PH}$=1.5 mm, $h\text{-}D_{PH}$=2.2 mm.

These yield ratios $W_P/h\text{-}D_{PH}$=3.5 and $H_P/v\text{-}D_{PH}$=3.3 and $H_P/H_M$=0.74 $H_M$=$H_P$+1.8 mm. In other examples, ratio $H_P/H_M$ may be in the range of 0.6-0.9 and $H_M$<$H_P$+4 mm may be fulfilled. In yet other examples, ratio $H_P/H_M$ may be in the range of 0.7-0.8 and $H_M$<$H_P$+2.5 mm or $H_M$<$H_P$+2 mm may be fulfilled.

In other examples of folded camera modules including a folded camera operational for large stroke OIS, values and ranges may be as given in Table 1.

OPFE holder 206 is divided into three parts, which can rotationally move relative to each other for actuating OPFE

204: a Yaw stage 208, frame 218 and a pitch stage 210. As described in the following, the relative movements are as follows:

Yaw stage 208 rotates around yaw rotation axis 222 relatively to frame 218 for OIS around a first OIS direction ("yaw rotation direction").

When yaw stage 208 rotates relatively to frame 218, pitch stage 210 moves together with (or "rides on") Yaw stage 208.

Pitch stage 210 rotates around pitch rotation axis 224 relatively to yaw stage 208 and relative to frame 218 for OIS around a second OIS direction ("pitch rotation direction"). In addition, folded camera module 200 includes a lens actuator 220 which is operational to move lens barrel 212 with the lens. For example, lens actuator 220 may move lens barrel 110 along an axis parallel to lens optical axis 214 for focusing.

Figure 3A:
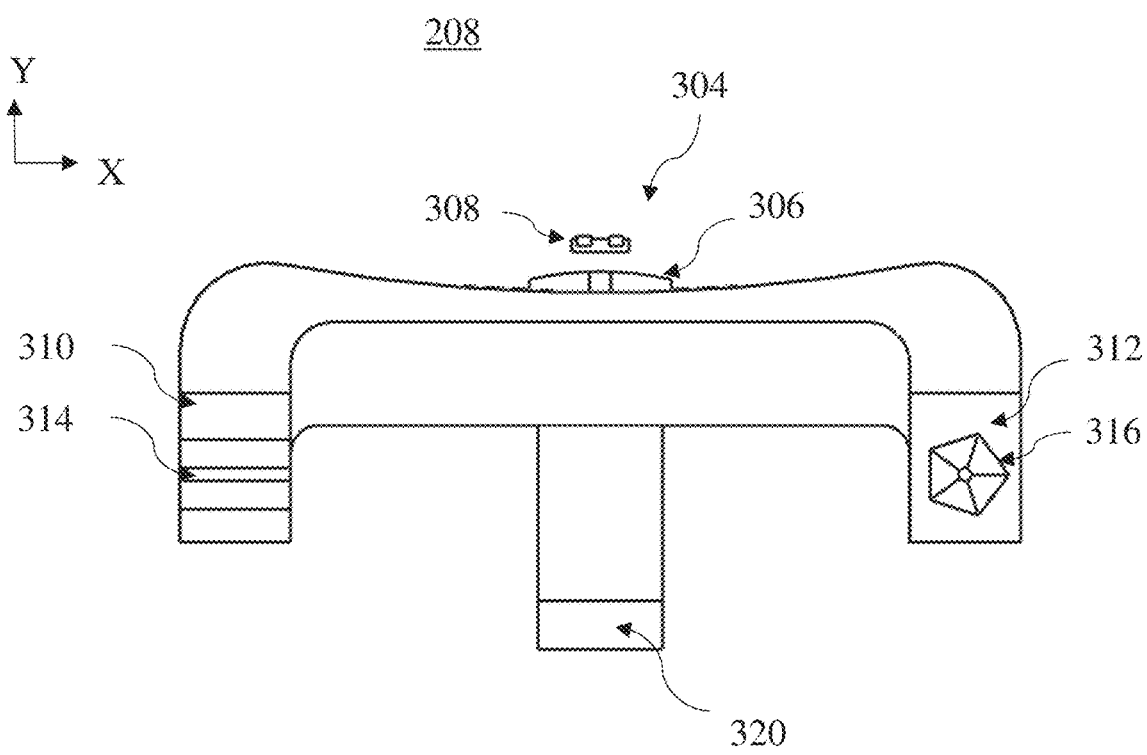
FIG. 3A shows a yaw stage in a top view.

FIG. 3A shows yaw stage 208 in a top view. Yaw stage 208 is shown without OPFE 204 for better visibility. Yaw stage 208 includes a yaw position sensing unit (PSU) 304 which includes a magnet 306 fixedly coupled to yaw stage 208 and a magnetic flux measuring device (MFMD) 308 fixedly coupled to frame 218. Yaw PSU 304 is operational to sense a relative movement between yaw stage 208 and frame 218. Yaw stage 208 has a left arm 310, a right arm 312 and a center arm 320. A top side of yaw stage 208 comprises a groove 314 included in left arm 310 and a cavity (or hole) 316 included in right arm 312.

Figure 3B:
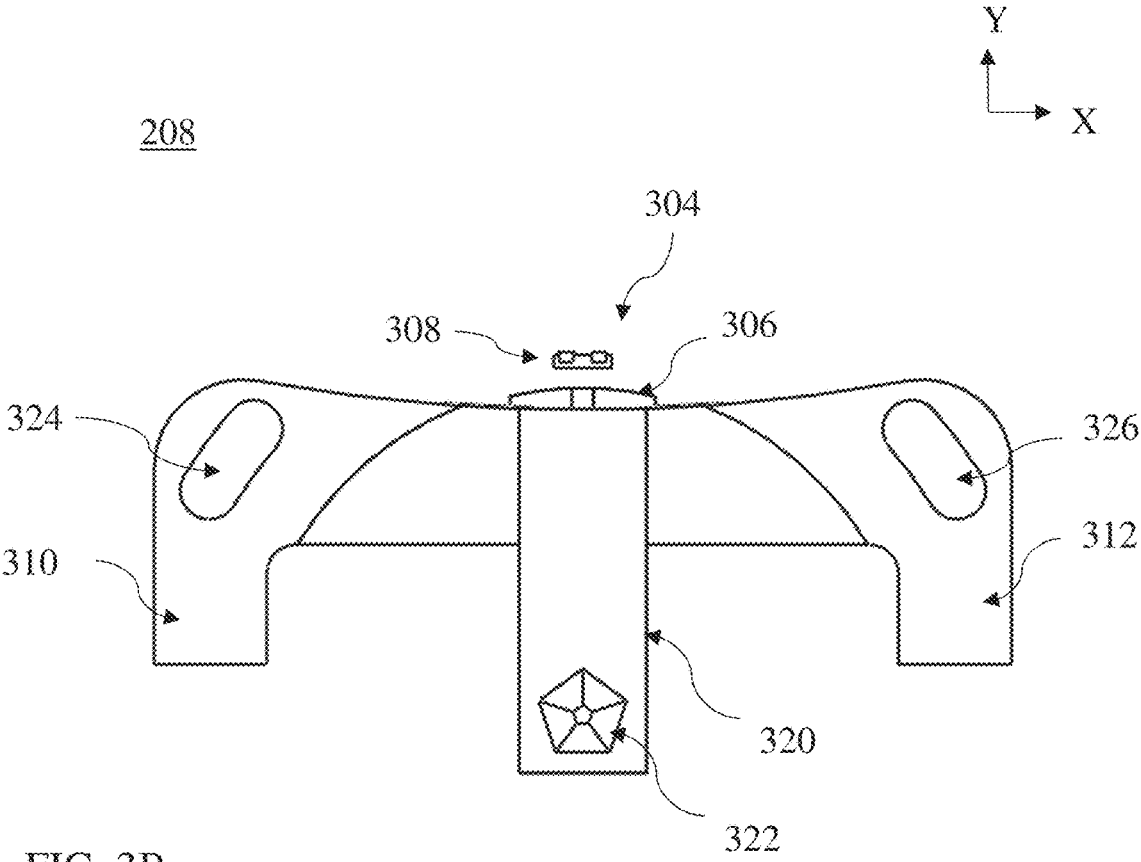
FIG. 3B shows the yaw stage in a bottom view.

FIG. 3B shows yaw stage 208 (without OPFE 204) in a bottom view. A bottom side of yaw stage 208 comprises a cavity 322 in center arm 320, a first hole (or void) 324 in left arm 310 and a second hole 326 in right arm 312.

Figure 3C:
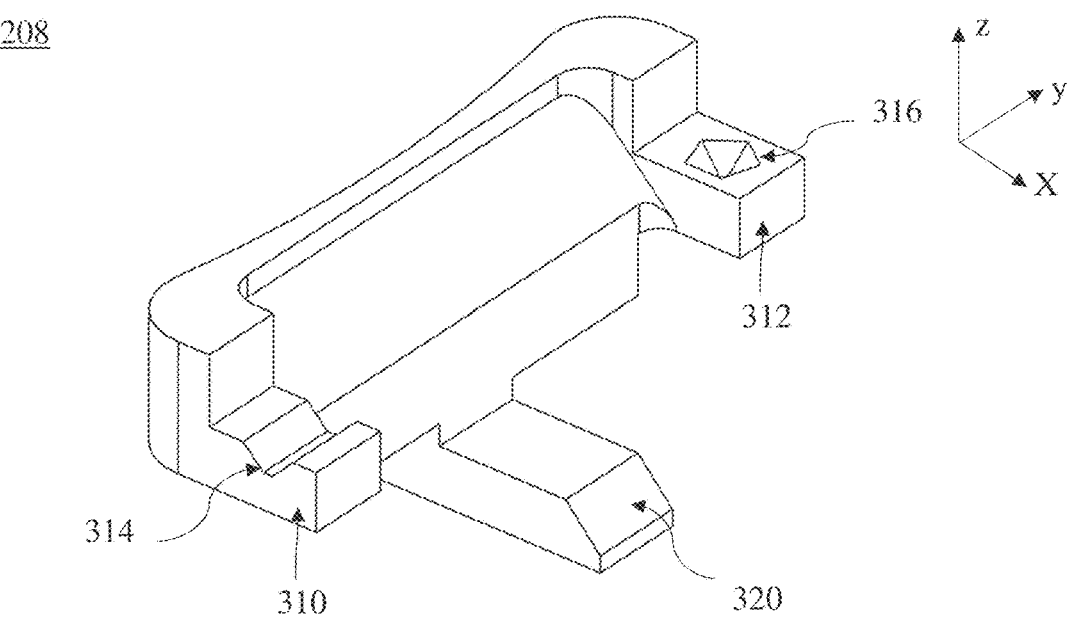
FIG. 3C shows the yaw stage in a perspective view.

FIG. 3C shows yaw stage 208 in a perspective view. Groove 314 included in left arm 310 and a cavity 316 in right arm 312 are visible.

Figure 3D:
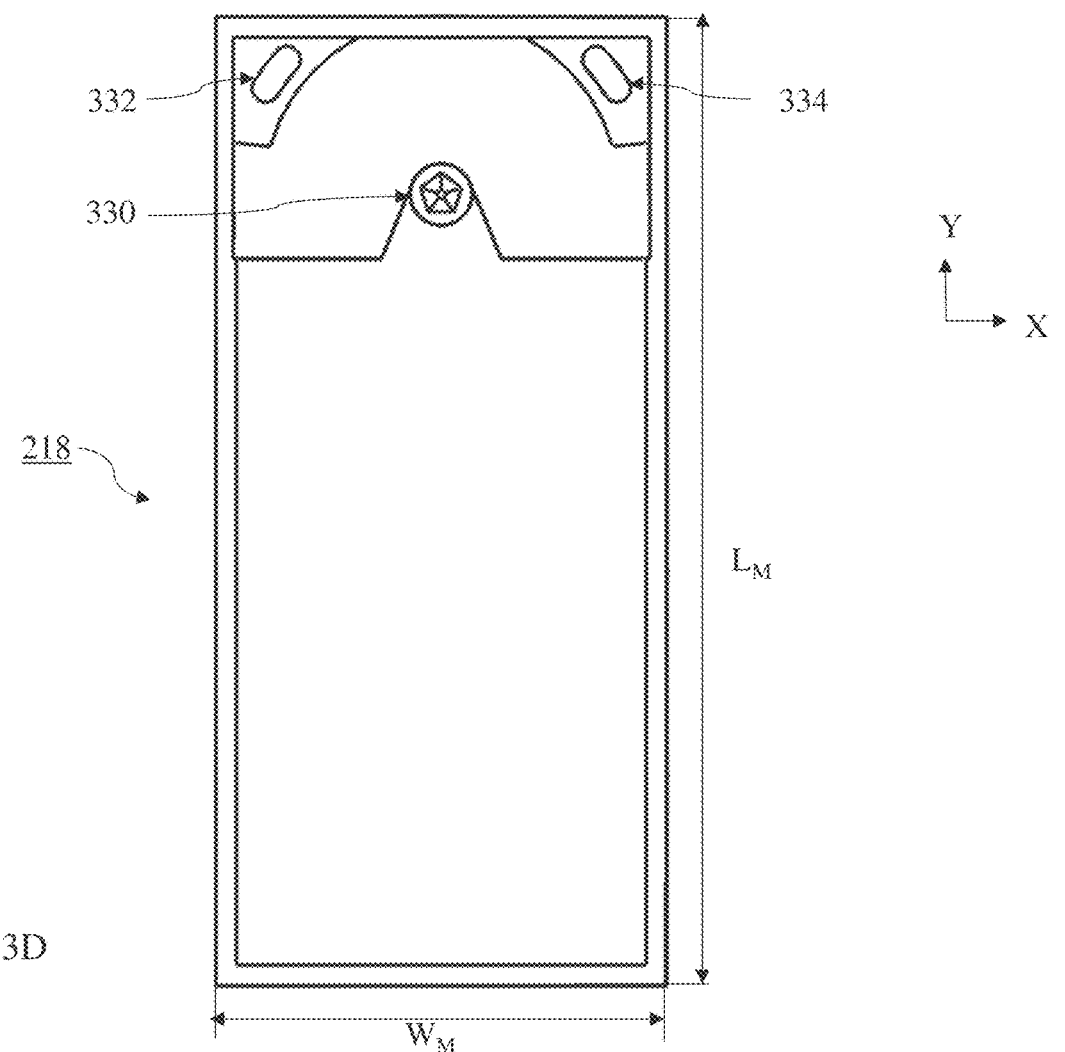
FIG. 3D shows a frame (or housing) of the folded camera module of FIGS. 2A-C in a top view.
Figures 3E, 3F:
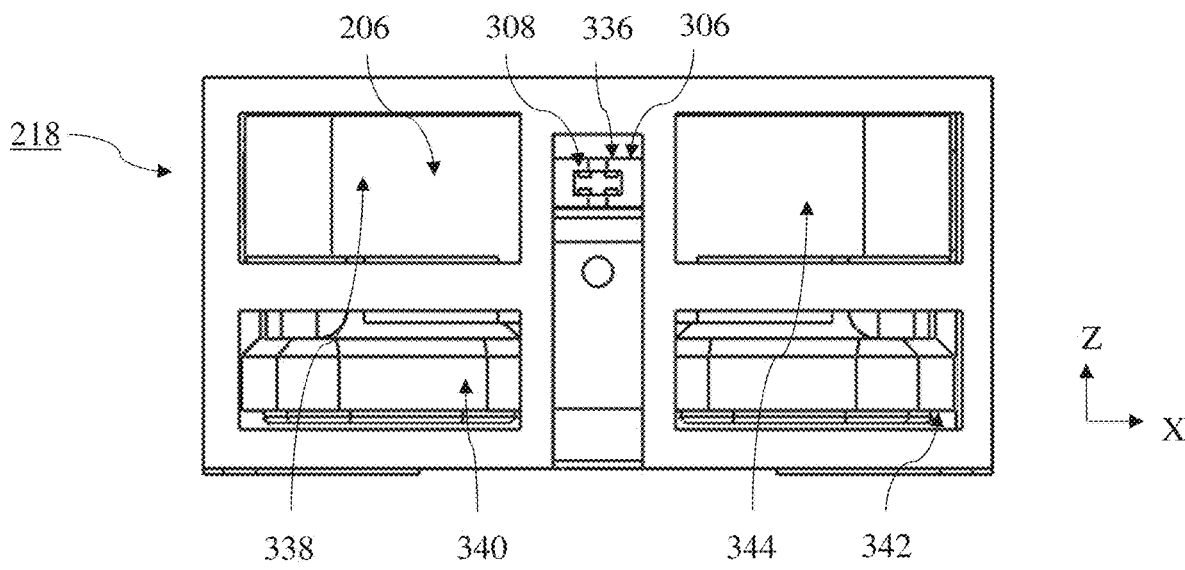
FIG. 3E shows the frame in a perspective view.
FIG. 3F shows the folded camera module of FIG. 2A in a side view.

FIG. 3D shows frame 218 of folded camera module 200 in a top view. FIG. 3E shows frame 218 in a perspective view. Frame 218 includes a cavity 330, a third hole 332 and a fourth hole 334. Yaw stage 208 can be moved relative to frame 218 by means of three ball-bearings: a first ball-bearing is formed by confining a first ball (not shown) within a first closed volume formed by first hole 324 (included in yaw stage 208) and third hole 332 (included in frame 218); a second ball-bearing is formed by confining a second ball (not shown) within a second volume formed by second hole 326 (included in yaw stage 208) and fourth hole 334 (included in frame 218); and a third ball-bearing is formed by confining a third ball (not shown) within a third volume formed by cavity 322 (included in yaw stage 208) and cavity 330 (included in frame 218). The location of the first ball-bearing is defined by first hole 324, the location of the second ball-bearing is defined by cavity 316 and the location of the third ball-bearing is defined by cavity 322. When prism 204 rotates around yaw rotation axis 222, the third ball-bearing acts as a pivot point (representing a first support position), and both the first and the second ball-bearings act as rails (representing a second and a third support position). This means that overall, rotating prism 204 around yaw rotation axis 222 uses three support positions.

The third ball-bearing is positioned at a first position "$Z_{F1}$" (along the z-axis) which is relatively close to a bottom of frame 218 when compared to the position of the first and second ball-bearings, "bottom" referring to a lowest dimension of frame 218 along the z-axis. Relative to the third ball-bearing, the first ball-bearing and the second ball-bearing are positioned at a same second elevated position "$Z_{F2}$" (along the z-axis), as shown. We refer to the first position as a "first floor", and to the second position as a "second floor". The first floor is distanced by a first distance (or height) $H_1$ along the z-axis from the second floor. The second floor is distanced by a second distance (or height) $H_2$ from a top of frame 218. As shown, $H_1 \approx H_2 \approx H_M/2$. It is noted that positioning the first ball-bearing and the second ball-bearing at the second floor is advantageous, because it leaves a free space or free volume in the first floor. A front surface of the first floor is marked 331.

In some examples and as shown, magnet 306 has a circular (or "round") shape. The circular shape may be such that the shape of magnet 306 is concentric with respect to the pivot point. The circular shape is advantageous for measuring exactly a rotation around yaw rotation axis 222, i.e. for providing an accurate Yaw PSU 304. This is because the distance (air gap) between magnet 306 and MFMD 308 is relatively constant, i.e. it changes only by a relatively small amount. In other examples, magnet 306 may have a rectangular (or "flat") shape. The flat shape may be advantageous for manufacturing a low-cost folded camera module 200.

FIG. 3F shows frame 218 of folded camera module 200 in a side view. Frame 218 includes a first notch 336, a second notch 338, a third notch 340, a fourth notch 342 and a fifth notch 344. Because of notch 336, MFMD 308 can measure a magnetic field of magnet 306.

Figure 3G:
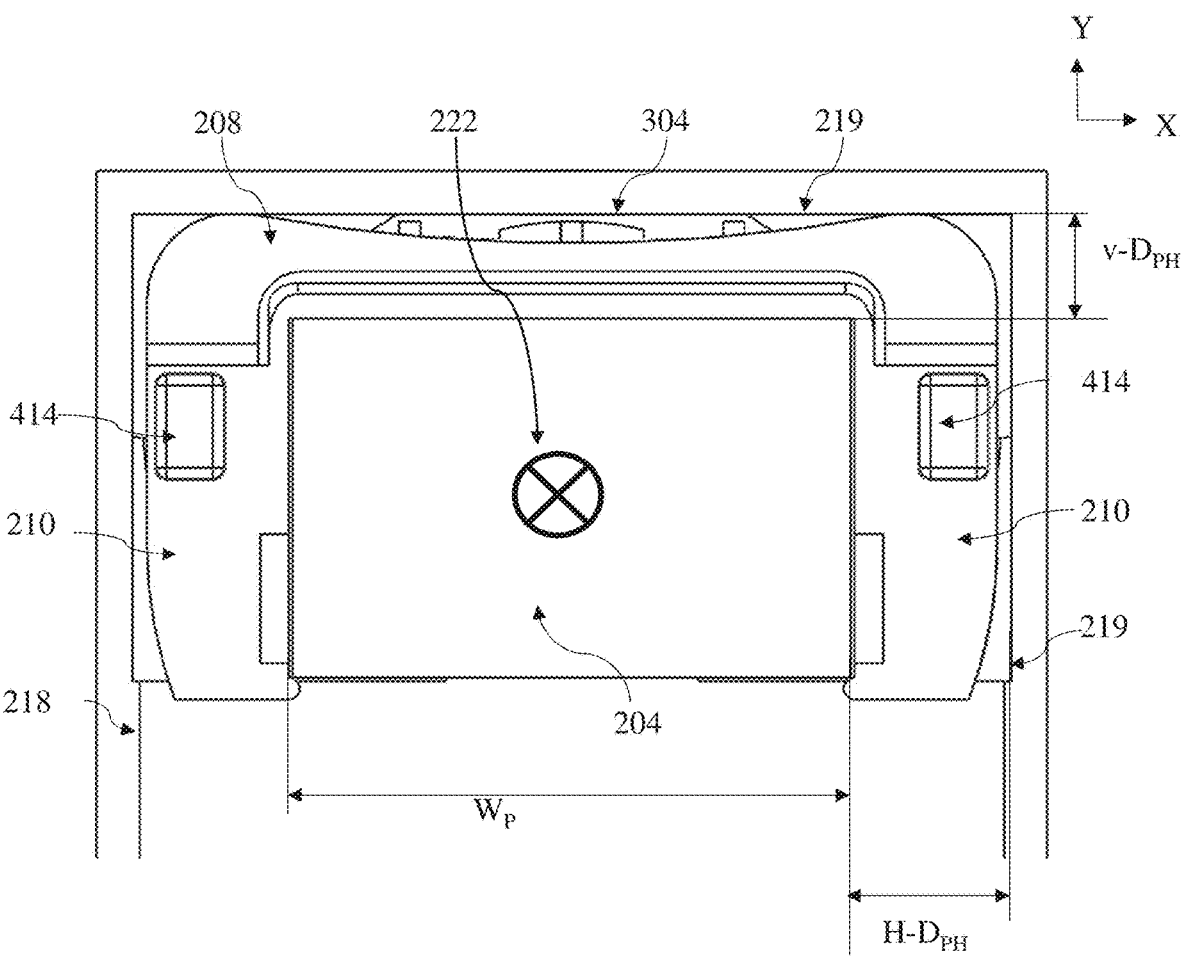
FIG. 3G shows a top part of the folded camera module of FIGS. 2A-C in a top view.

FIG. 3G shows a top part of folded camera module 200 in a top view. OPFE 204 is shown in "yaw zero-state" with respect to yaw rotation axis 222. "Yaw zero-state" refers here to an OPFE yaw rotation state that represents a center of a yaw rotation stroke defined by a minimum yaw rotation angle $Yaw_{Min}$ and a maximum yaw rotation angle $Yaw_{Max}$.

Figure 3H:
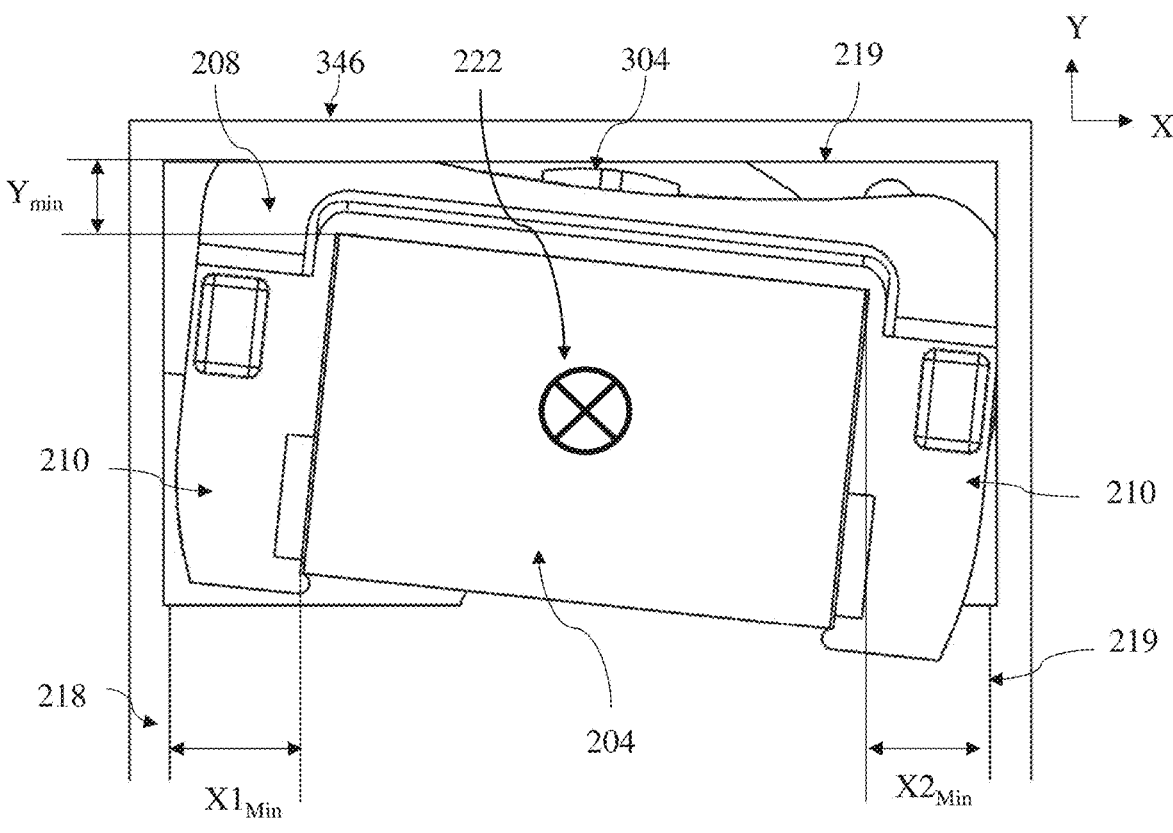
FIG. 3H shows a top part of the folded camera module of FIGS. 2A-C with an OPFE shown in a $\text{Yaw}_{Max}$-state with respect to a yaw rotation axis.

FIG. 3H shows a top part of folded camera module 200 with OPFE 204 shown in the $Yaw_{Max}$-state with respect to yaw rotation axis 222. "$Yaw_{Max}$-state" refers here to an OPFE yaw rotation state that represents a first extreme (here, a maximum) yaw rotation angle. In the $Yaw_{Max}$-state, OPFE 204 is located at a minimum distance $Y_{Min}$ measured along the y-axis, a first minimum distance $X1_{Min}$ measured along the x-axis, and a second minimum distance $X2_{Min}$ measured along the x-axis away from an inner boundary (or border) of frame 218, as shown. In folded camera module 200, $Y_{Min}=1.1$ mm, $X1_{Min}=2.0$ mm and $X2_{Min}=1.9$ mm. A ratio $Y_{Min}/L_M$ when $L_M=29$ mm) is $Y_{Min}/L_M=0.037$. Ratios of $X1_{Min}/W_M$ and $X2_{Min}/W_M$ when $W_M=13.5$ mm are $X1_{Min}/W_M=0.148$ and $X2_{Min}/W_M=0.141$.

In other examples, minimum distances such as distances $X1_{Min}$ and $X2_{Min}$ may be equal to or smaller that 5 mm, or more advantageously $\leq 3$ mm, or $\leq 2.75$ mm, or $\leq 2.5$ mm or even 2.25 mm. The ratio $X_{Min}/W_M$ may be in the range of 0.05 to 0.25. $Y_{Min}$ may be $\leq 5$ mm, or more advantageously $\leq 2$ mm, or $\leq 1.75$ mm, or $\leq 1.5$ mm or even $\leq 1.25$ mm. The ratio $Y_{Min}/L_M$ may be in the range of 0.015 to 0.075.

Figure 3I:
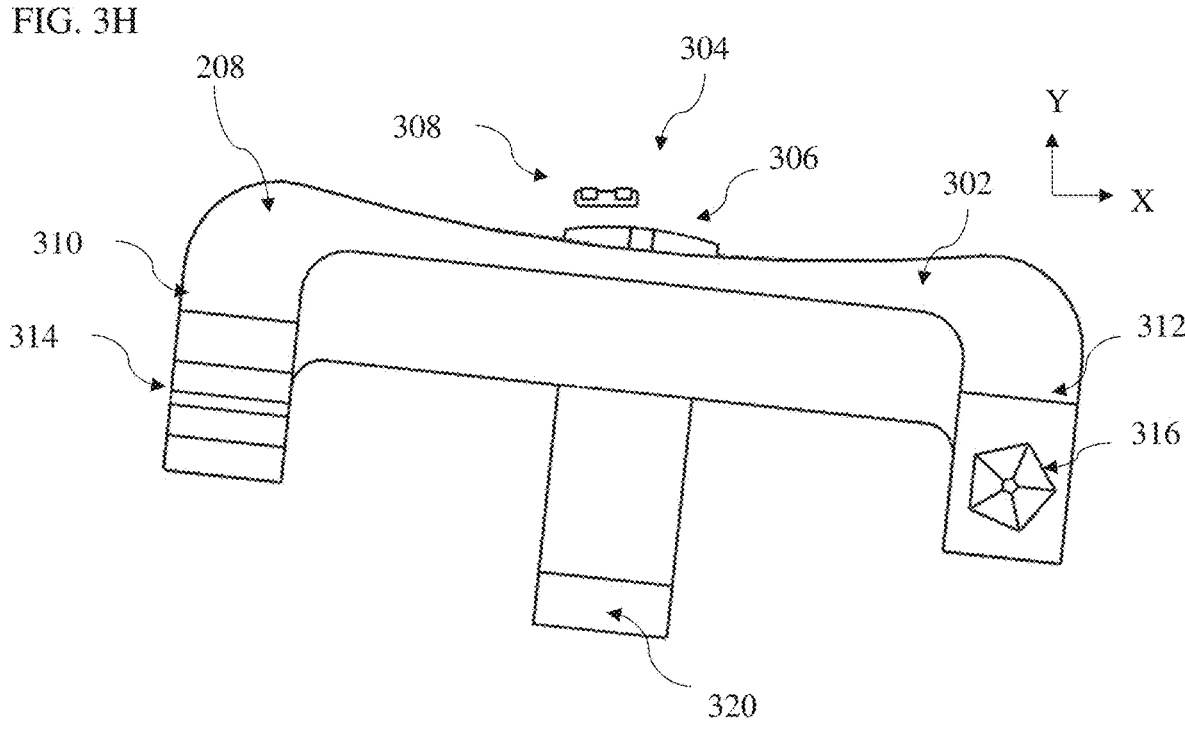
FIG. 3I shows the yaw stage without the OPFE in a $\text{Yaw}_{Max}$-state with respect to the yaw rotation axis.

FIG. 3I shows yaw stage 208 without OPFE 204 in the $Yaw_{Max}$-state with respect to yaw rotation axis 222. FIG. 3I also shows the position of magnet 306 relative to MFMD 308 in this state.

Figure 3J:
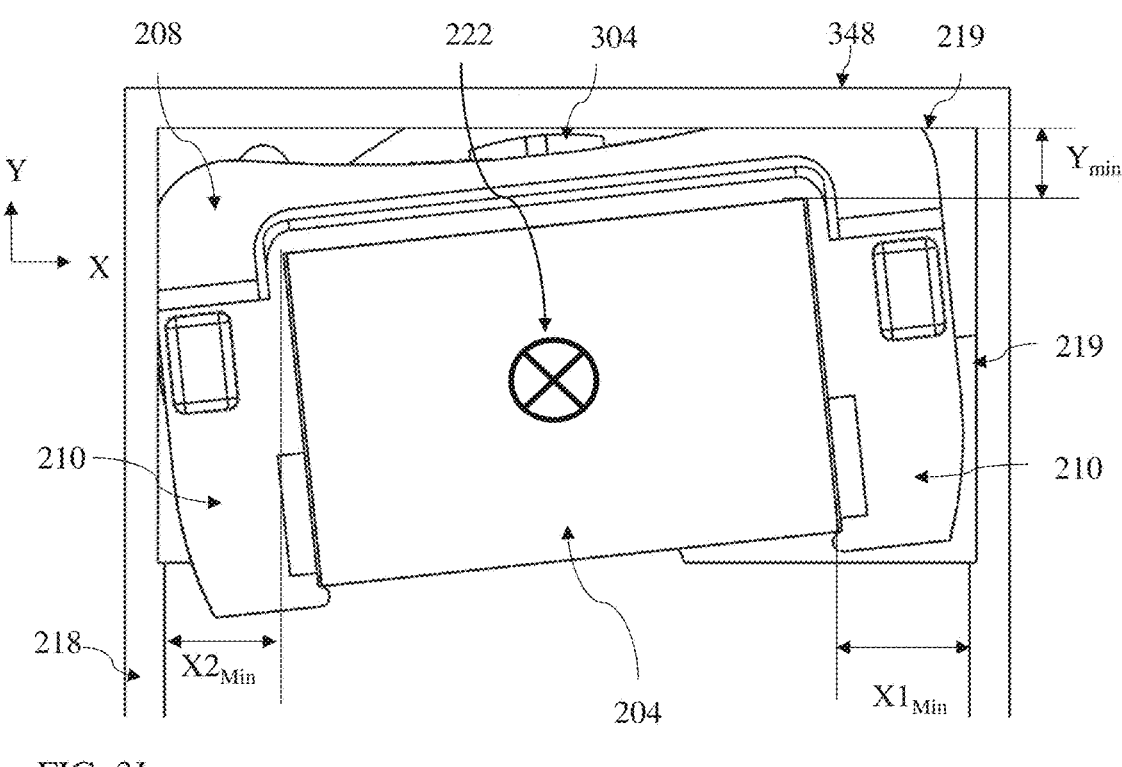
FIG. 3J shows a top part of the folded camera module of FIGS. 2A-C with the OPFE shown in a "$\text{Yaw}_{Min}$-state" with respect to the yaw rotation axis.

FIG. 3J shows a top part of folded camera module 200 with OPFE 204 shown in the $Yaw_{Min}$-state with respect to yaw rotation axis 222 pitch rotation direction. "$Yaw_{Min}$-state" refers here to an OPFE yaw rotation state which represents a second extreme (here, a minimum) yaw rotation angle. In the $Yaw_{Min}$-state, OPFE 204 is located at a minimum distance $Y_{Min}$ measured along the y-axis, a first minimum distance $X1_{Min}$ measured along the x-axis, and a second minimum distance $X2_{Min}$ measured along the x-axis away from an inner boundary of frame 218, as shown.

Figure 3K:
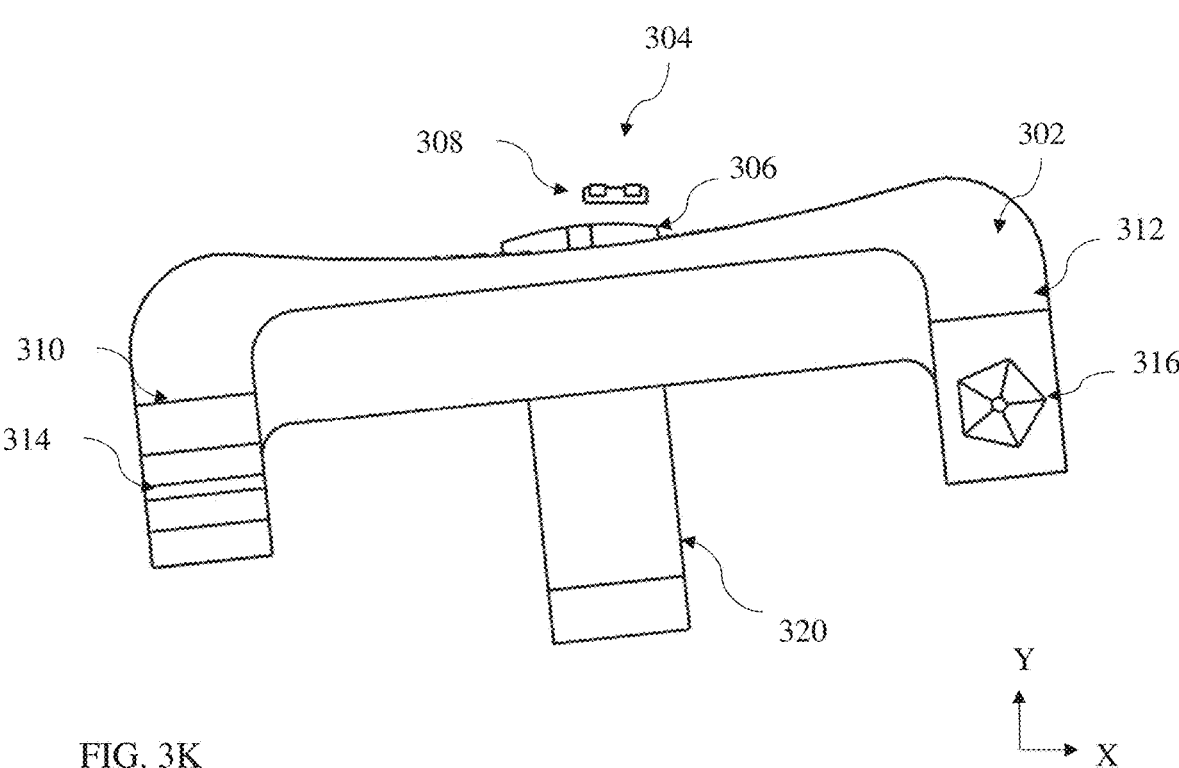
FIG. 3K shows the yaw stage without the OPFE in a $\text{Yaw}_{Min}$-state with respect to the yaw rotation axis.

FIG. 3K shows yaw stage 208 without OPFE 204 in the "$Yaw_{Min}$-state" with respect to yaw rotation axis 222. FIG. 3K also shows the position of magnet 306 relative to MFMD 308 in this state.

In FIG. 3H and FIG. 3J it is visible that a certain part of yaw stage 208 can enter one of second notch 338 and third notch 340 at a position marked 346 or enter fourth notch 342 and fifth notch 344 at a position marked 348. This is advantageous for achieving a compact folded camera module.

Figures 3L, 3M:
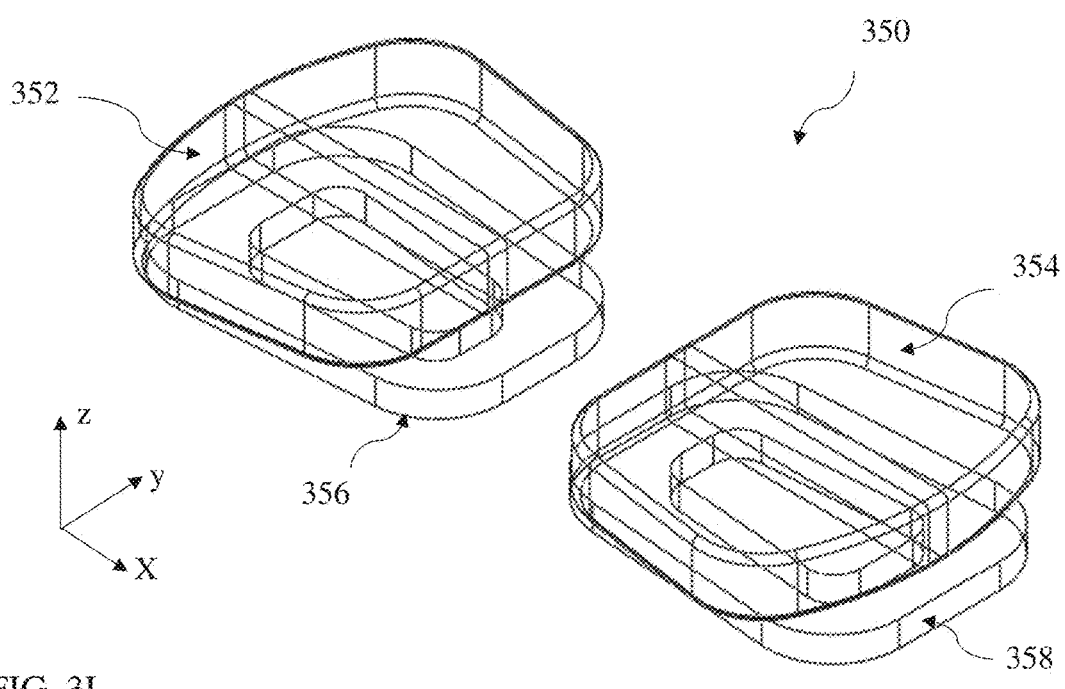
FIG. 3L shows a voice coil motor (VCM) disclosed herein in a perspective view.
FIG. 3M shows the VCM of FIG. 3L included in the folded camera module of FIGS. 2A-C in a bottom view.
Figure 3N:
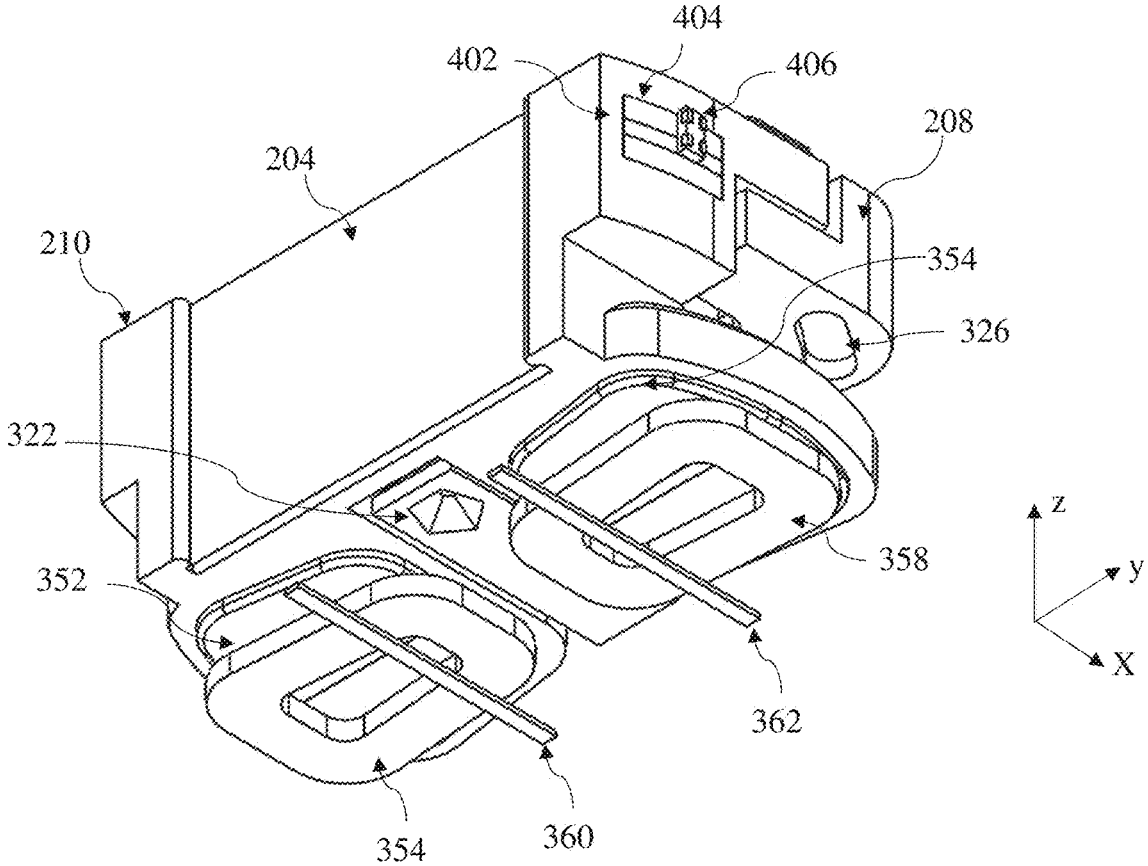
FIG. 3N shows the VCM of FIG. 3L included in an OPFE holder in a perspective bottom view.

FIG. 3L shows a VCM disclosed herein and numbered 350 in a perspective view. FIG. 3M shows VCM 350 included in folded camera module 200 in a bottom view. FIG. 3N shows VCM 350 included in OPFE holder 206 in a perspective bottom view. VCM 350 is operational to actuate a rotational movement of OPFE 204 around both yaw rotation axis 222 and pitch rotation axis 224. VCM 350 includes a first magnet 352 and a second magnet 354 (both fixedly coupled to yaw stage 208) as well as a first coil 356 and a second coil 358 (both fixedly coupled to frame 218). In addition, VCM 350 includes a first yoke (or preload yoke) 360 and a second yoke (or preload yoke) 362. Both yokes are fixedly coupled to frame 218. The yokes are operational for returning VCM 350 to a zero-position and to prevent disengagement of the parts included in OPFE holder 206. First magnet 352 has a first magnet dead zone (DZ) 353 and second magnet 354 has a second magnet DZ 355. As shown in FIG. 3M and approximately, pitch rotation axis 224 coincides with first magnet DZ 353 and second magnet DZ 355. First magnet 352 and second magnet 354 together cover (or use) a relatively large bottom area of OPFE holder 206. The fact that the magnets cover a relatively large bottom area of OPFE holder 206 is advantageous in that it allows a relatively strong and fast, yet still compact VCM. This is enabled by locating the first and second ball bearings at the second floor. A free space or free volume created in the first floor can be used to position the magnets.

Figure 4A:
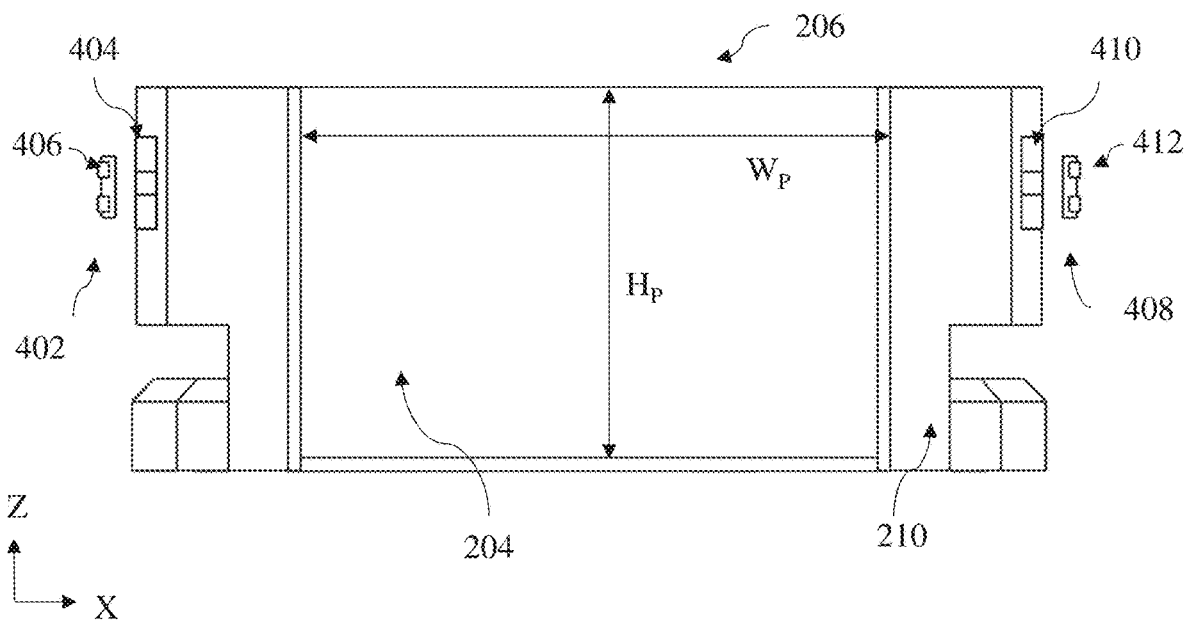
FIG. 4A shows a pitch stage of the folded camera module of FIGS. 2A-C and including the OPFE in a front view.

FIG. 4A shows pitch stage 210 and OPFE holder 206 with OPFE 204 in a front view. Pitch stage 210 includes a first pitch PSU 402 having a first pitch magnet 404 and a first pitch MFMD 406, as well as a second pitch PSU 408 having a second pitch magnet 410 and a second pitch MFMD 412.

Figure 4B:
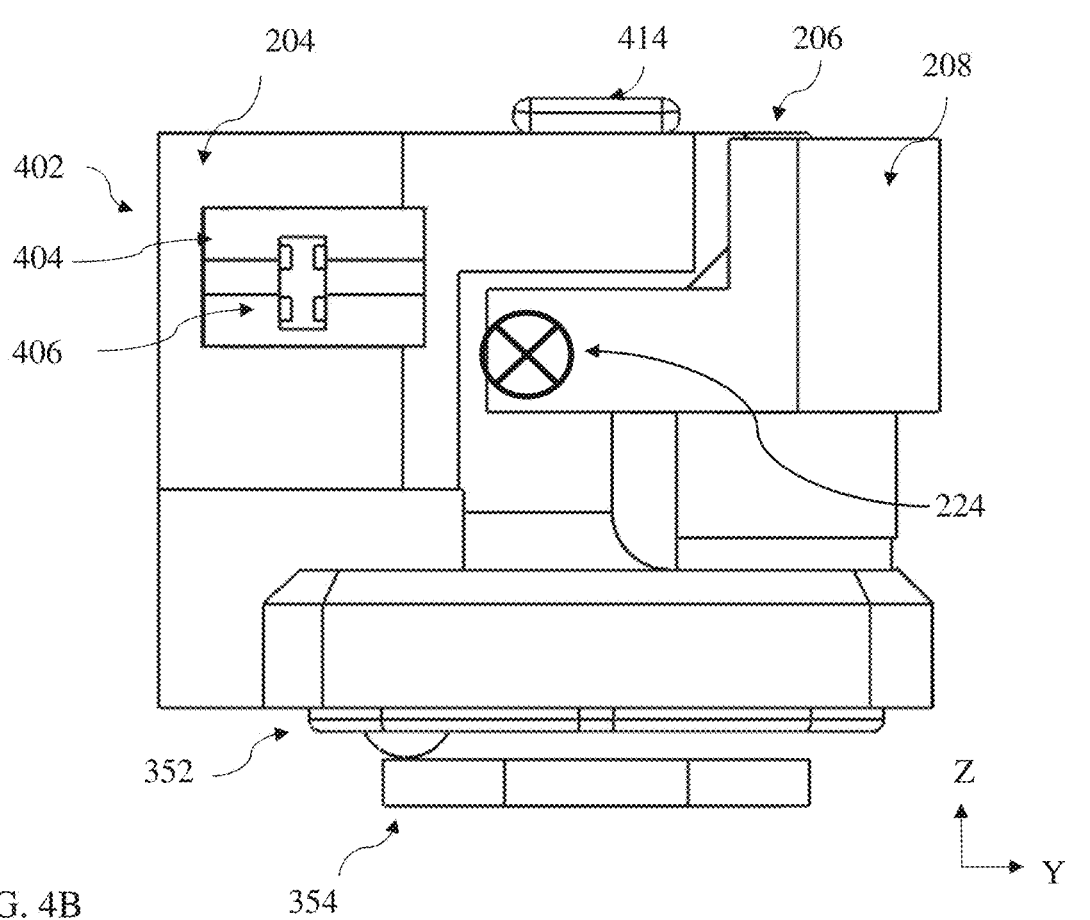
FIG. 4B shows the pitch stage and the OPFE of FIG. 4A in a side view, with the OPFE shown in a "pitch zero state" with respect to a pitch direction.

FIG. 4B shows pitch stage 210 with OPFE 204 in a side view. OPFE 204 is shown in a "pitch zero state" with respect to a pitch rotation direction. "Pitch zero-state" refers here to an OPFE pitch rotation state that represents a center of a pitch rotation stroke defined by a minimum pitch rotation angle $Pitch_{Min}$ and a maximum pitch rotation angle $Pitch_{Max}$. In the pitch zero-state, first pitch PSU 402 is in a zero-state. OPFE holder 206 includes a shock (or drop) absorber mechanism 414. Shock absorber mechanism 414 is operational to prevent yaw stage 208 and pitch stage 210 from disengaging from each other and/or from OPFE holder 206. Pitch rotation axis 224 is oriented parallel to the x-axis (i.e. perpendicular to the coordinate system shown).

First pitch PSU 402 and second pitch PSU 408 are located concentrically with respect to yaw rotation axis 222. It is noted that first pitch PSU 402 and second pitch PSU 408 are located at a relatively large distance from each other, and in addition, they are located at a relatively large distance from Yaw PSU 304. This is advantageous as there is virtually no electromagnetic crosstalk between each of yaw PSU 304, first pitch PSU 402 and second pitch PSU 408. With respect to a direction along the y-axis, pitch rotation axis 224 is located (or positioned) within an area that also includes OPFE 204.

Figure 4C:
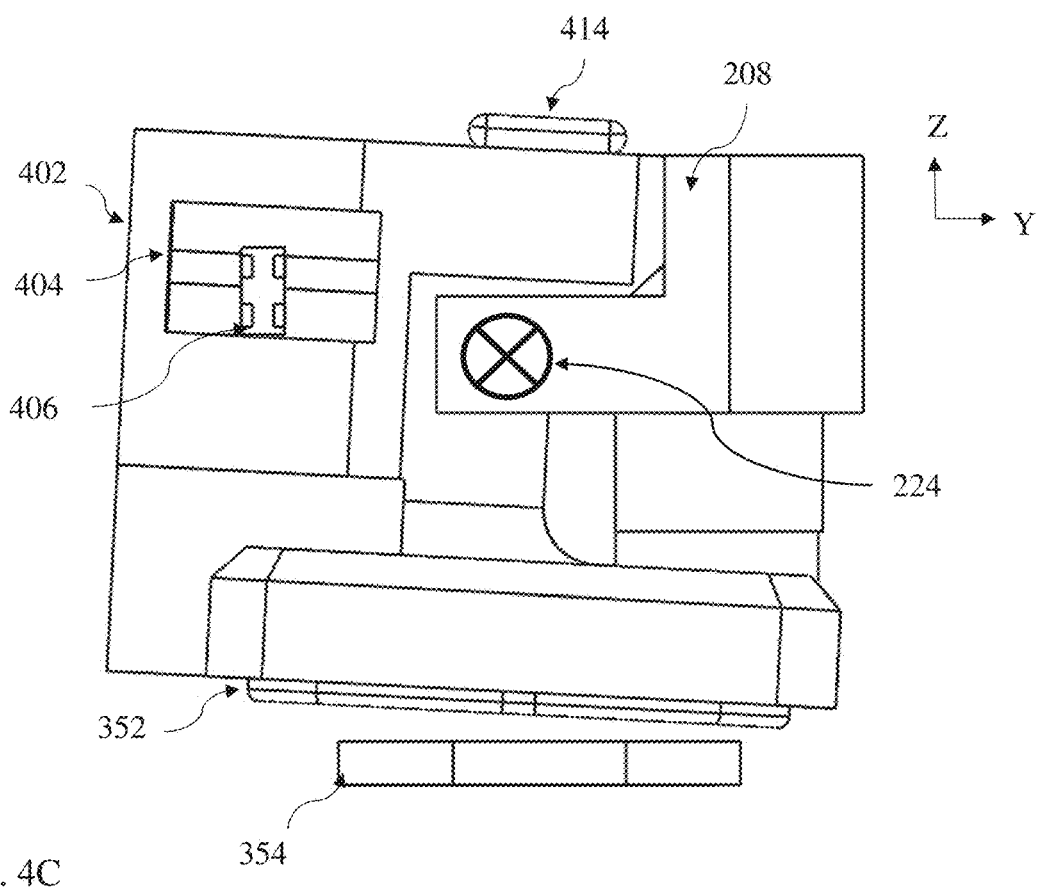
FIG. 4C shows the pitch stage in a side view with the OPFE shown in a $\text{Pitch}_{Max}$-state with respect to the pitch rotation axis.

FIG. 4C shows pitch stage 210 in a side view with OPFE 204 shown in a "$Pitch_{Max}$-state" with respect to a pitch direction. "$Pitch_{Max}$-state" refers here to an OPFE pitch rotation state that represents a maximum pitch rotation angle. In $Pitch_{Max}$-state, first pitch PSU 402 is in a maximum-state.

Figure 4D:
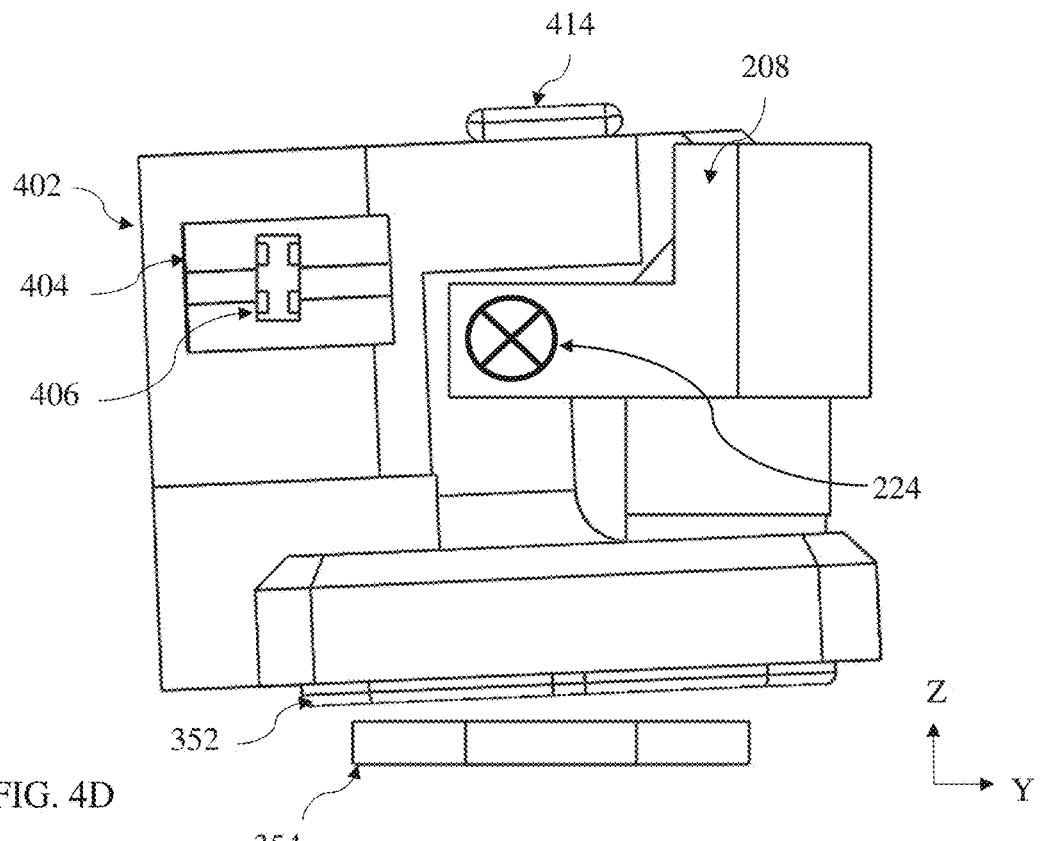
FIG. 4D shows the pitch stage in a side view with the OPFE shown in a $\text{Pitch}_{Min}$-state with respect to a pitch rotation axis.

FIG. 4D shows pitch stage 210 in a side view with OPFE 204 shown in a "$Pitch_{Min}$-state" with respect to a pitch rotation direction. "$Pitch_{Min}$-state" refers here to an OPFE pitch rotation state that represents a minimum pitch rotation angle. In $Pitch_{Min}$-state, first pitch PSU 402 is in a minimum-state.

In FIG. 3N, it is visible that magnet 404 has a circular shape. The circular shape may be approximately so that a shape of magnet 404 is concentric with respect to the pivot point. The circular shape is advantageous for an accurate first pitch PSU 402. This is because the distance between magnet 404 and MFMD 406 is relatively constant when performing rotation around the Yaw rotation axis. In other embodiments, magnet 404 may have a rectangular (or "flat") shape. The flat shape may be advantageous for a low cost folded camera module 200. Pitch stage 210 can be moved relative to yaw stage 208 by means of two ball-bearings: a first ball-bearing is formed by confining a fourth ball (not shown) within a fourth volume formed by groove 314 (included in yaw stage 208) and a groove (not shown, included in pitch stage 210), a second ball-bearing is formed by confining a fifth ball (not shown) within a fifth volume formed by cavity 316 (included in yaw stage 208) and a cavity (not shown, included in pitch stage 210).

With reference to FIG. 3L and FIG. 3M, we note that VCM 350 is configured to actuate a rotation of OPFE 204 both around a yaw rotation axis such as yaw rotation axis 222 and around a pitch rotation axis such as pitch rotation axis 224. I.e. VCM 350 has a first operation mode operational to actuate a yaw rotation, and VCM 350 has a second operation mode operational to actuate a pitch rotation.

Actuating Yaw Rotation

For rotating OPFE 204 in a yaw rotation direction, a current flowing through (or induced in) first coil 356 is directed opposite to a current flowing through coil 358.

Actuating Pitch Rotation

For rotating OPFE 204 in a pitch rotation direction, a current flowing through (or induced in) first coil 356 is directed identical to a current flowing through coil 358.

Table 1 presents values and ranges of components disclosed herein. $L_M$, $H_M$, $W_M$, $L_P$, $H_P$, $W_P$, $Y_{Min}$, $X1_{Min}$, $X2_{Min}$, V-$D_{PH}$ and h-$D_{PH}$ are given in mm, $Yaw_{Min}$, $Yaw_{Max}$, $Pitch_{Min}$, $Pitch_{Max}$, $Yaw_{FOV}$ and $Pitch_{FOV}$ are given in degrees.

TABLE 1

|  | Range | Preferred range |
| --- | --- | --- |
| $L_M$ | 10-50 | 15-35 |
| $H_M$ | 4-15 | 5-10 |
| $W_M$ | 5-20 | 7.5-15 |
| $L_P$ | 2.5-15 | 4-8 |
| $H_P$ | 2.5-15 | 4-8 |
| $W_P$ | 3-20 | 5-10 |
| v-$D_{PH}$ | 1-5 | 1.5-3 |
| h-$D_{PH}$ | 1-5 | 2-4 |
| $Yaw_{Min}/Yaw_{Max}$ | −10/0 | −6/6 |
| $Pitch_{Min}/Pitch_{Max}$ | −5/5 | −3/3 |
| $Yaw_{FOV}$ | −10/10 | −6/6 |
| $Pitch_{FOV}$ | −10/10 | −6/6 |
| $Y_{Min}$ | 0.25-5 | 0.5-2 |
| $X1_{Min}$ | 0.5-5 | 1-3 |

TABLE 1-continued

|  | Range | Preferred range |
|---|---|---|
| $X2_{Min}$ | 0.5-5 | 1-3 |
| $W_P$/h-$D_{PH}$ | 0.8-20 | 1.25-5 |
| $H_P$/v-$D_{PH}$ | 0.5-15 | 1.33-2.67 |

Figures 5A, 5B:
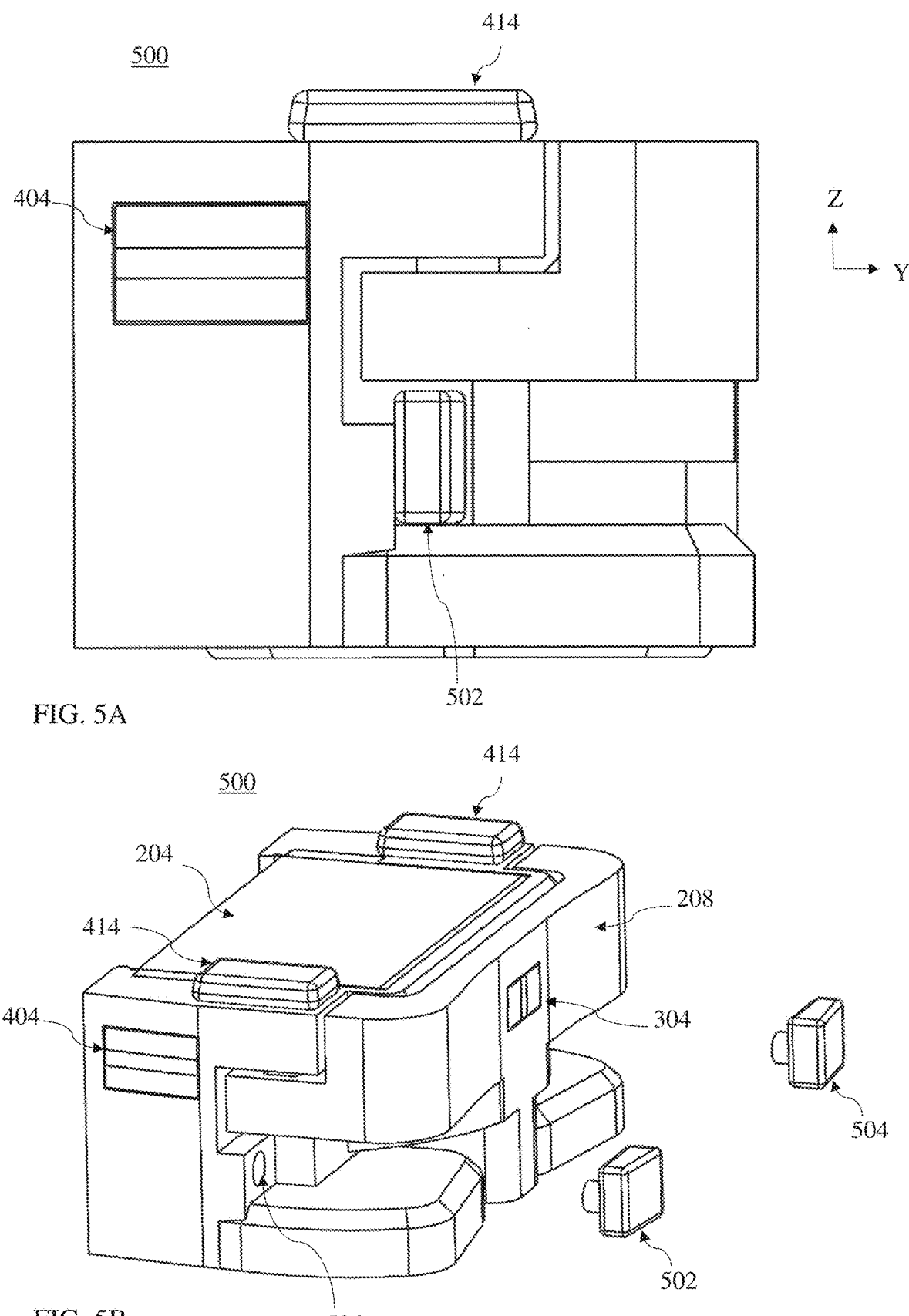
FIG. 5A shows another pitch stage disclosed herein in a side view, with the OPFE shown in a yaw zero state with respect to a yaw rotation axis.
FIG. 5B shows the pitch stage of FIG. 5A in a perspective view, with the OPFE shown in a yaw zero state with respect to a rotation axis.
Figure 5C:
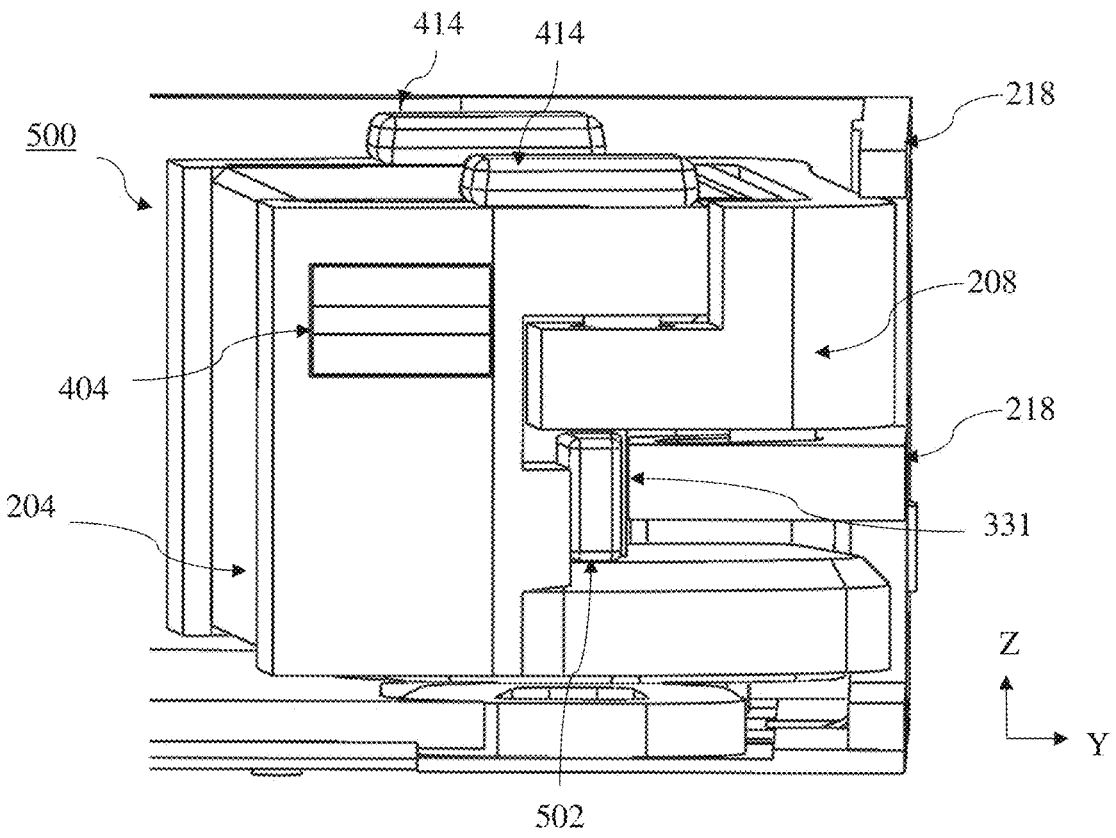
FIG. 5C shows the pitch stage of FIG. 5A included in a frame in a perspective view and in a $\text{Yaw}_{Min}$-state with respect to a yaw rotation axis.
Figure 5D:
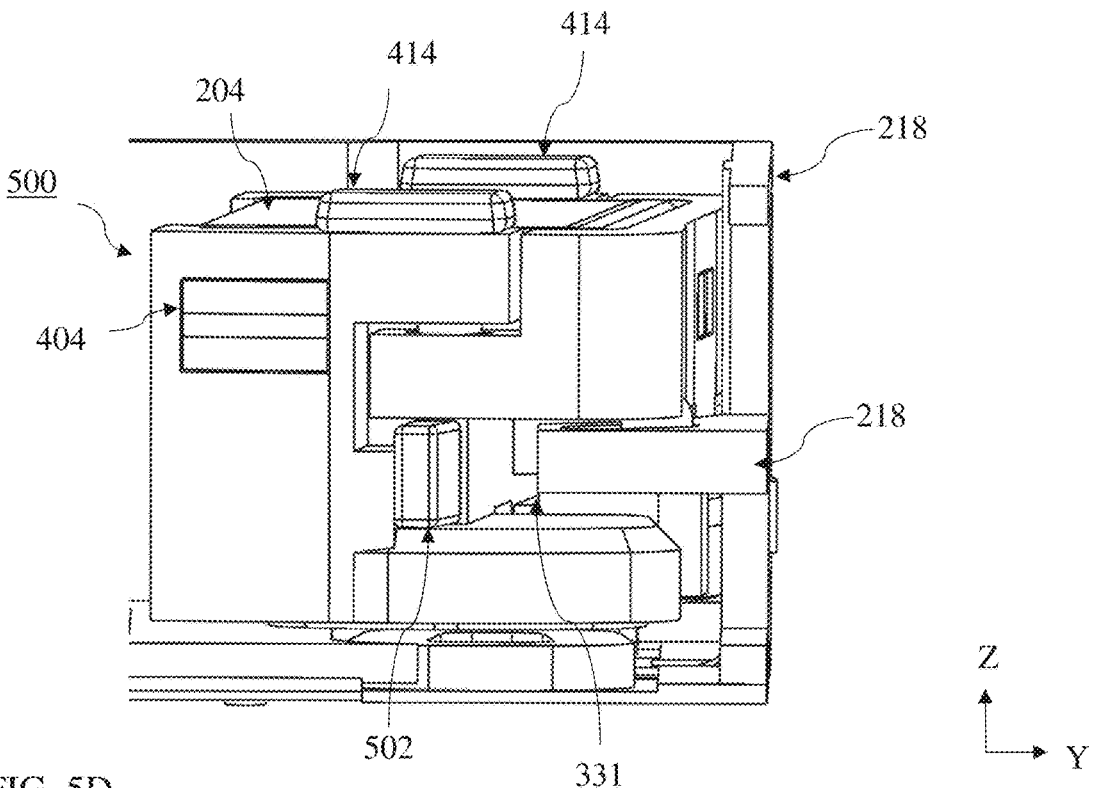
FIG. 5D shows the pitch stage of FIG. 5A included in a frame in a perspective view and in a $\text{Yaw}_{Max}$-state with respect to the yaw rotation axis.

FIG. 5A shows another pitch stage numbered 500, operational to be included in a folded camera module such as folded camera module 200 and including an OPFE 204 in a side view. FIG. 5B shows pitch stage 500 in a perspective view. In FIGS. 5A-B, OPFE 204 is shown in a "yaw zero state" with respect to a yaw rotation axis. The yaw zero state is located at a center between a minimum Yaw rotation position and a maximum Yaw rotation position (FIGS. 5C-D). Pitch stage 500 includes a first stopper 502 and a second stopper 504, which both are fixedly coupled to pitch stage 500.

FIG. 5B shows an assembly of first stopper 502 and a second stopper 504. Pitch stage 500 includes a hole 506, which is operational to receive stopper 502. Entering (or pushing) stopper 502 into hole 506 may suffice to fixedly couple stopper 502 to pitch stage 500. Pitch stage 500 also includes another hole (not shown), which is operational to receive stopper 504. Stopper 502 and stopper 504 may for example be made of rubber material.

FIG. 5C shows another pitch stage 500 included in frame 218 in the $Yaw_{Min}$-state. In the $Yaw_{Min}$-state, stopper 502 is in contact with front surface 331 of the first floor. This contact prevents a further rotation of pitch stage 500 in a Yaw rotation direction. FIG. 5D shows another pitch stage 500 included in frame 218 in the $Yaw_{Max}$-state. In the $Yaw_{Max}$-state, stopper 504 (not visible here) may be in contact with another front surface of the first floor, so that further rotation of pitch stage 500 in a Yaw rotation direction is prevented.

Figures 6A, 6B:
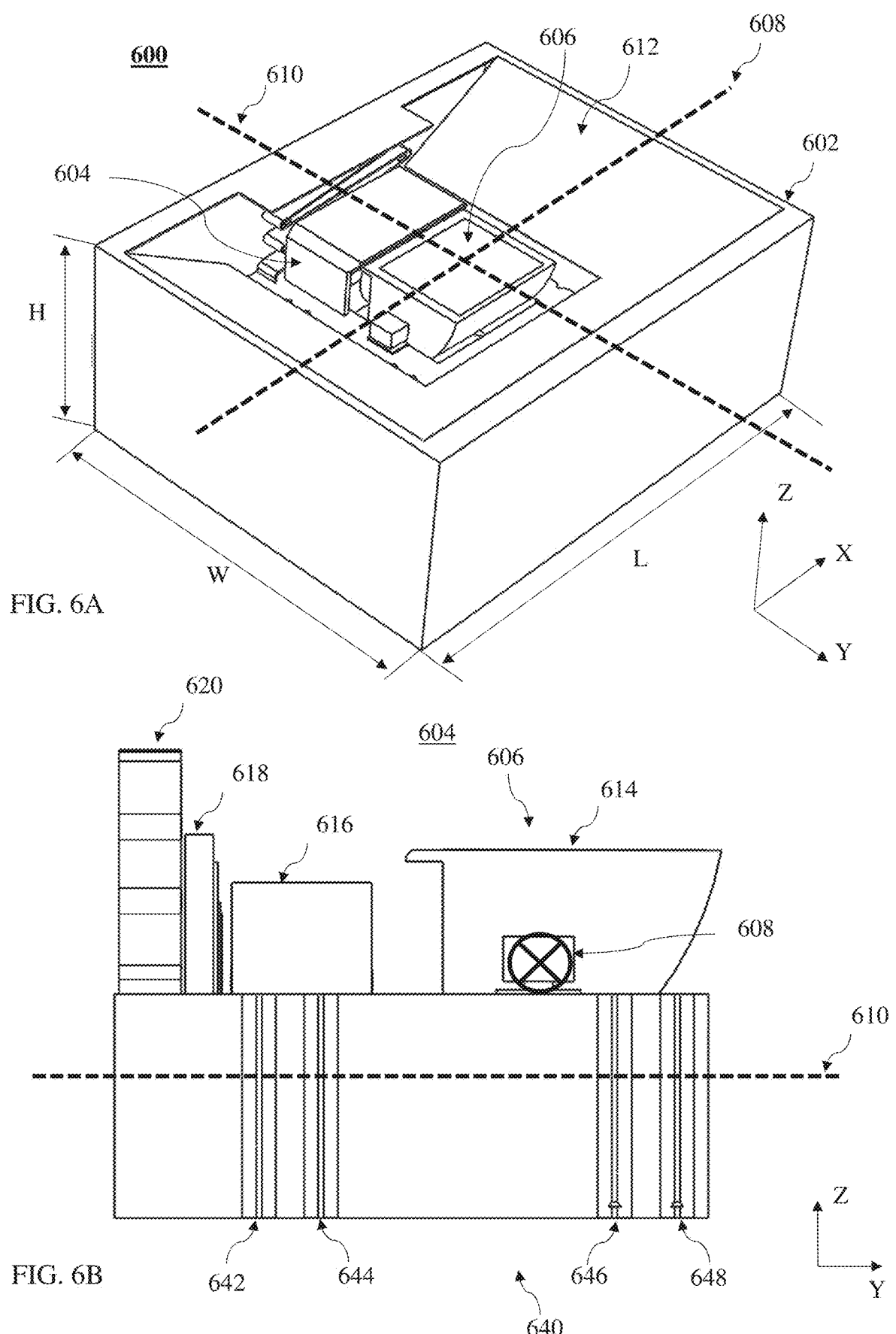
FIG. 6A shows a scanning zoom camera (SZC) as disclosed herein in a perspective view.
FIG. 6B shows a component of the SZC shown in FIG. 6A in a side view.

FIG. 6A shows a SZC 600 as disclosed herein in a perspective view. SZC 600 has a SZC FOV ("$FOV_{SZC}$") and includes a static (or "fixed") part 602, a moving part 604 and a SZC aperture 606. With respect to a host device including SZC 600, static part 602 does not move, and moving part 604 moves. Moving part 604 rotates along a first rotation axis 608 oriented parallel to the x-axis and a second rotation axis 610 oriented parallel to the y-axis. Static part 602 includes an opening (or "funnel") 612.

FIG. 6B shows moving part 604 in a side view. SZC 600 includes a prism 614 which represents SZC aperture 606, a lens 616 and an image sensor 618. Moving part 604 also includes a flexure (or "flex cable") 620 operational to electrically connect moving part 604 with static part 602. Moving part 604 also includes a set of rails 640 including a first rail 642, a second rail 644, a third rail 646 and a fourth rail 648. Set of rails 640 may interact with another set of rails (not shown) included in static part 602 to allow a rotational movement of moving part 604 relative to static part 602 around second rotation axis 610.

A height "H", a width ("W") and a length ("L") of SZC 600 may be in the range of H=5 mm-30 mm, W=10 mm-80 mm and L=10 mm-100 mm, advantageously H=10 mm-25 mm, W=20 mm-50 mm and L=25 mm-75 mm. Lens 616 may have an effective focal length ("EFL") in the range of 2 mm-40 mm, advantageously EFL is in the range of 2 mm-20 mm. Image sensor 618 may have an image sensor (full) diagonal ("SD") in the range of 2 mm-20 mm, advantageously SD is in the range of 2 mm-15 mm. Here, SZC 600 has a $FOV_{SZC}$ of about 75 degrees (about 28 mm 35 mm equivalent focal length). In other examples, $FOV_{SZC}$ may be in the range of about 15 degrees to 100 degrees.

Figure 6C:
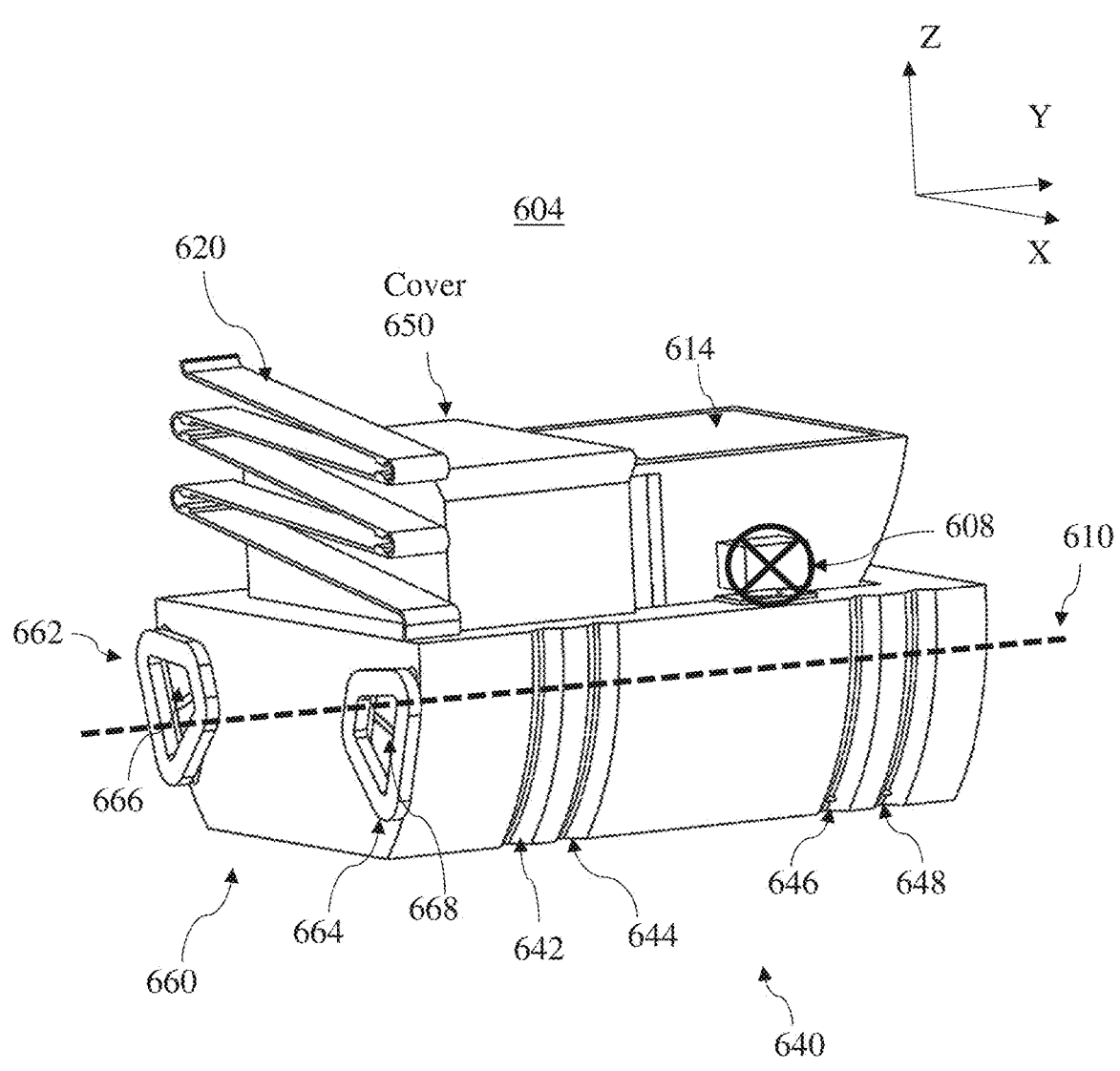
FIG. 6C shows the component shown in FIG. 6B in a perspective view.

FIG. 6C shows moving part 604 in a perspective view. Here, prism 614, lens 616 and image sensor 618 are covered by a cover 650. SZC 600 includes a second rotation actuator 660, operational to actuate a rotation of moving part 604 around second rotation axis 610. Here, second rotation actuator 660 is a voice coil motor (VCM) that includes a first coil 662 and a second coil 664 which are both fixedly coupled to static part 602. Second rotation actuator 660 also includes a first magnet 666 and a second magnet 668 which are both fixedly coupled to moving part 604.

Figure 7A:
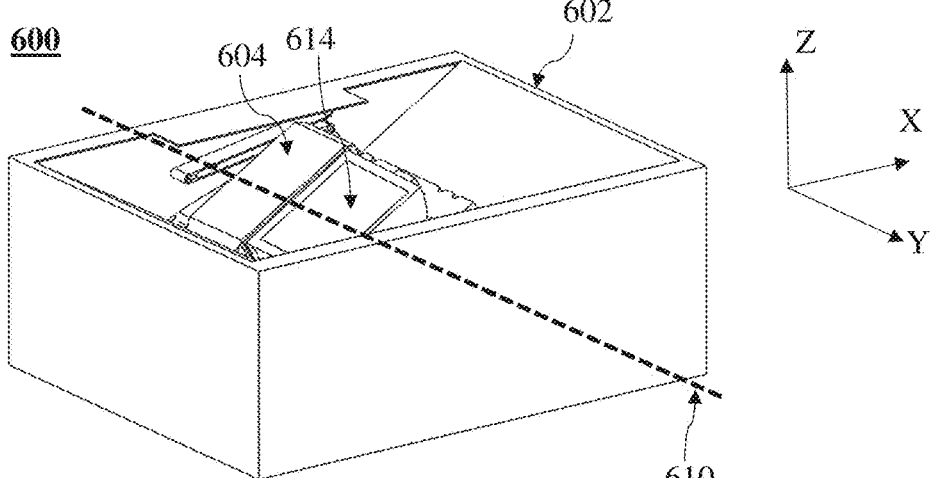
FIG. 7A shows the SZC of FIG. 6A in a first extreme rotation state with respect to a second rotation axis in a perspective view.
Figure 7B:
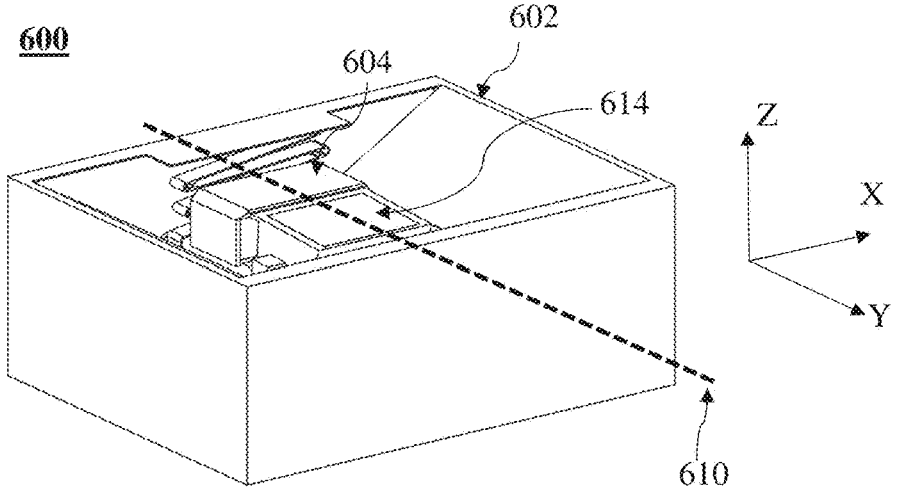
FIG. 7B shows the SZC of FIG. 6A in a center rotation state with respect to a second rotation axis in a perspective view.
Figure 7C:
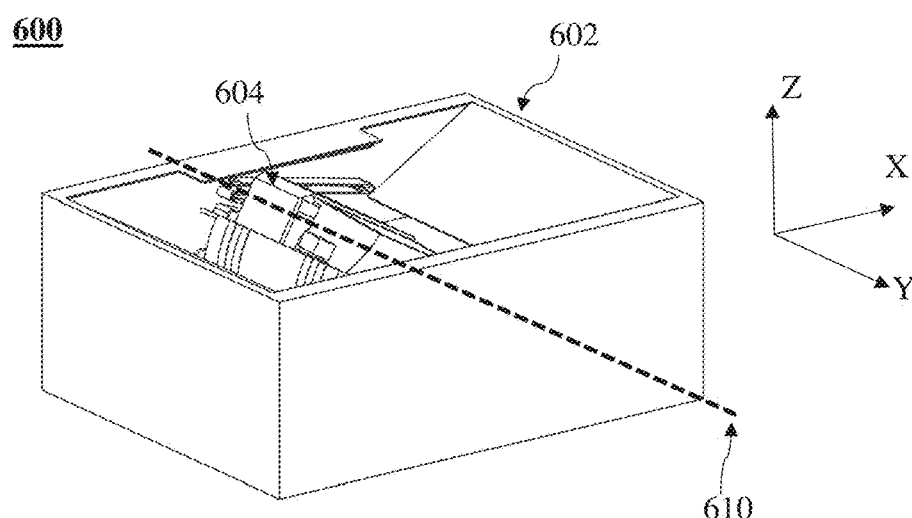
FIG. 7C shows the SZC of FIG. 6A in a second extreme rotation state with respect to a second rotation axis in a perspective view.
Figure 8A:
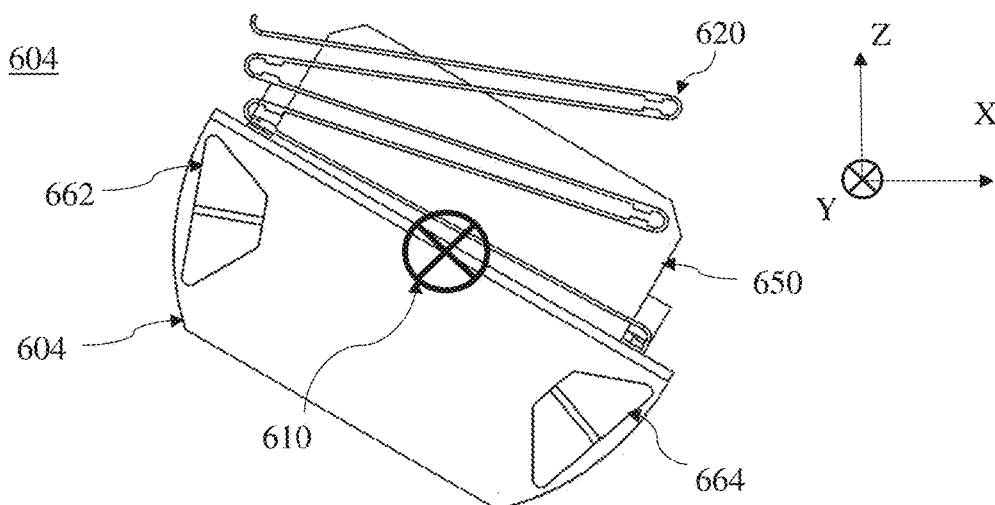
FIG. 8A shows the component shown in FIG. 6B in a first extreme rotation state with respect to a second rotation axis in a side view.
Figure 8B:
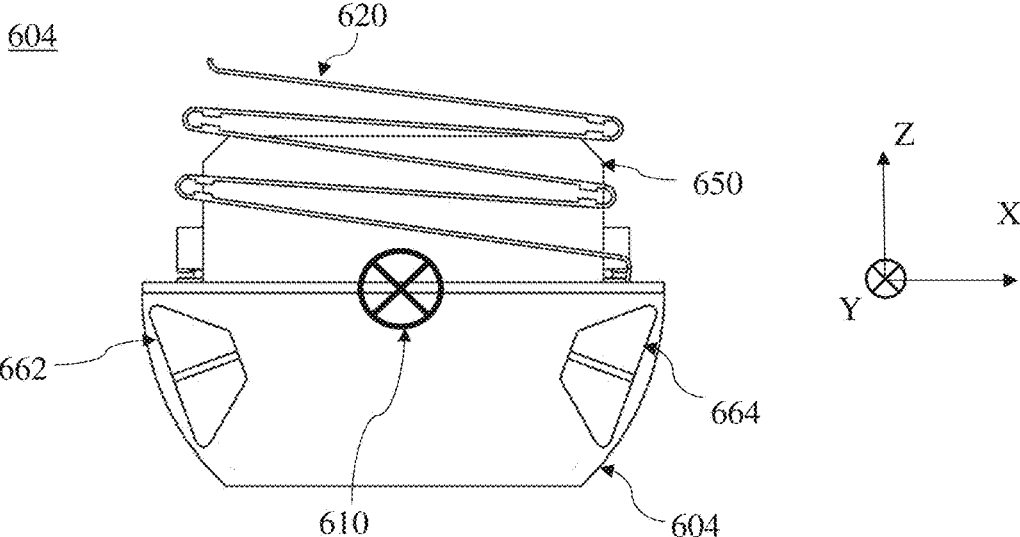
FIG. 8B shows the component shown in FIG. 6B in a center rotation state with respect to a second rotation axis in a side view.
Figure 8C:
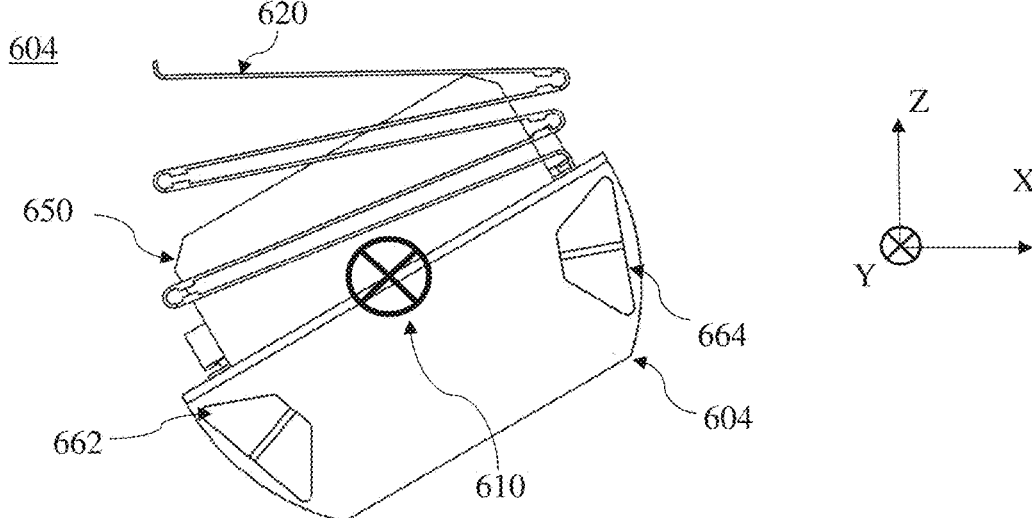
FIG. 8C shows component shown in FIG. 6B in a second extreme rotation state with respect to a second rotation axis in a side view.

FIGS. 7A-C show SZC 600 in several rotation states with respect to second rotation axis 610 in a perspective view. FIGS. 8A-C show SZC 600 in several rotation states with respect to the second rotation axis 610 in a perspective view. FIG. 7A and FIG. 8A respectively show SZC 600 in in a first extreme rotation state. FIG. 7B and FIG. 8B respectively show SZC 600 in a center rotation state. In general, and with reference to a dual camera including SZC 600 and a Wide camera having a $FOV_W$>$FOV_{SZC}$, in a center rotation state, $FOV_{SZC}$ is centered in $FOV_W$ with respect to second rotation axis 610. FIG. 7C and FIG. 8C respectively show SZC 600 in a second extreme rotation state. The first and the second extreme rotation state with respect to the second rotation axis 610 may correspond to a rotation in the range of ±10 degrees to ±45 degrees, for example ±30 degrees or ±25 degrees. In some examples, the Wide camera may capture Wide image data of $FOV_W$. A camera controller may be configured to analyze the Wide image data and scan a scene with $FOV_{SZC}$ based on the analysis of Wide image data.

Figures 9A, 9B, 9C:
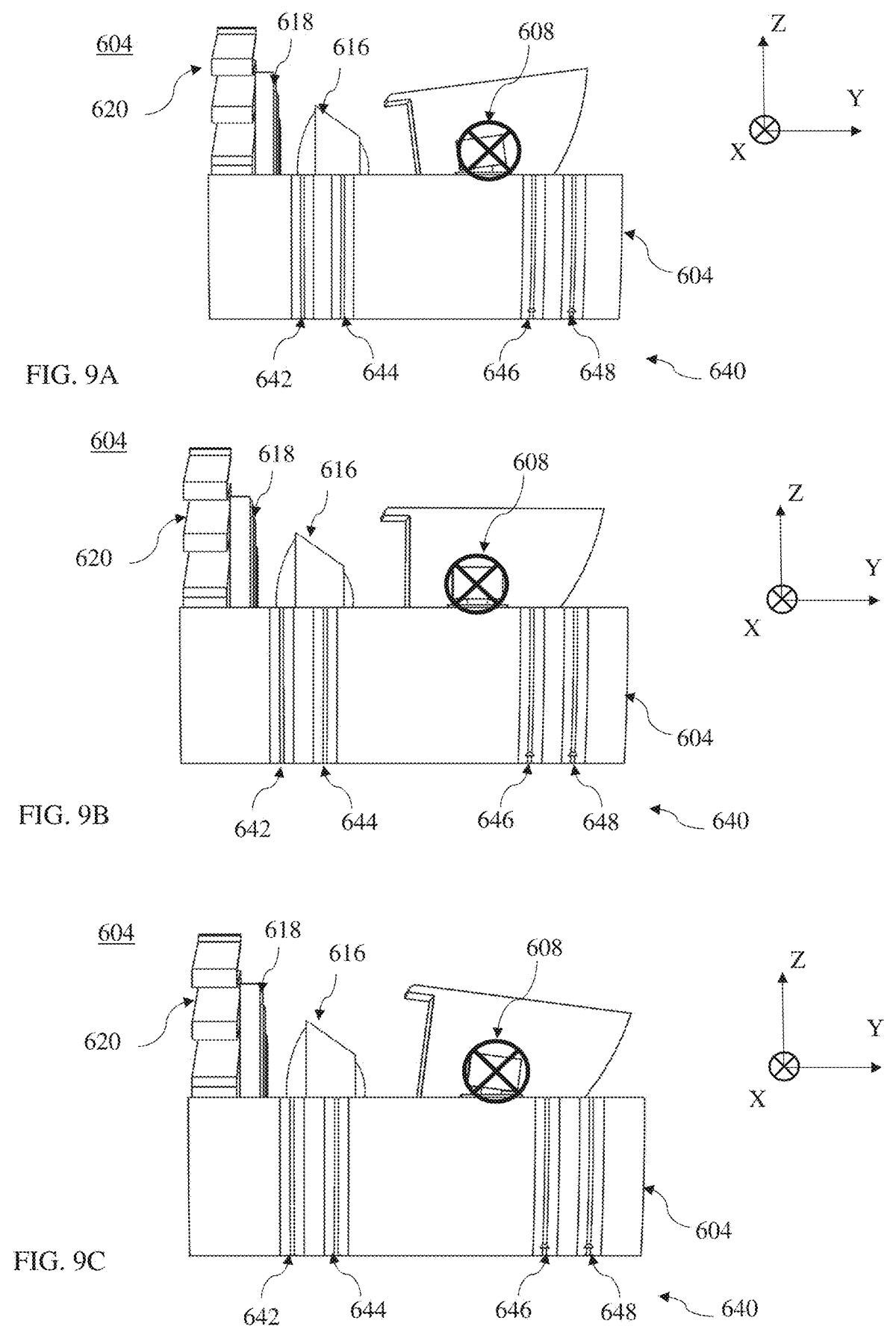

FIGS. 9A-C show SZC 600 in several rotation states with respect to first rotation axis 608 in a side view. FIG. 9A shows SZC 600 in a first extreme rotation state. FIG. 9B shows SZC 600 in a center rotation state. In general, and with reference to a dual camera including SZC 600 and a Wide camera, in a center rotation state, $FOV_{SZC}$ is centered in $FOV_W$ with respect to first rotation axis 608. FIG. 9C shows SZC 600 in a second extreme rotation state. The first and the second extreme rotation state with respect to the first rotation axis 608 may correspond to a rotation in the range of ±5 degrees to ±30 degrees, for example ±7.5 degrees or ±15 degrees. We note that SZC 600 does not create point-of-view aberrations, which is advantageous.

Figure 10A:
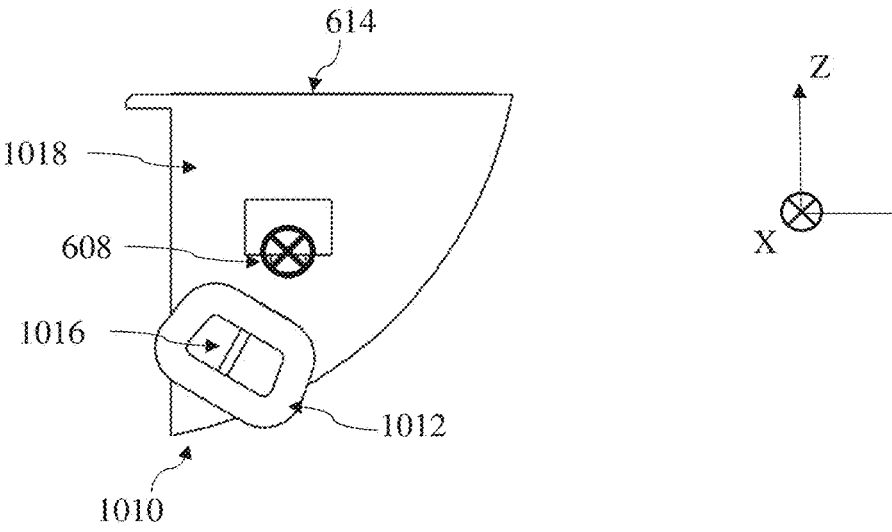
FIG. 10A shows another component of the SZC shown in FIG. 6A in a side view in a side view.
Figure 10B:
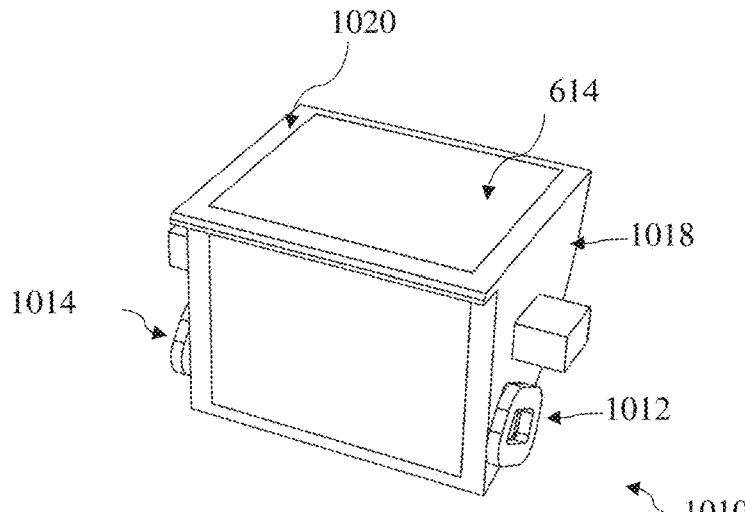
FIG. 10B shows the component shown in FIG. 10A in a first perspective view.
Figure 10C:
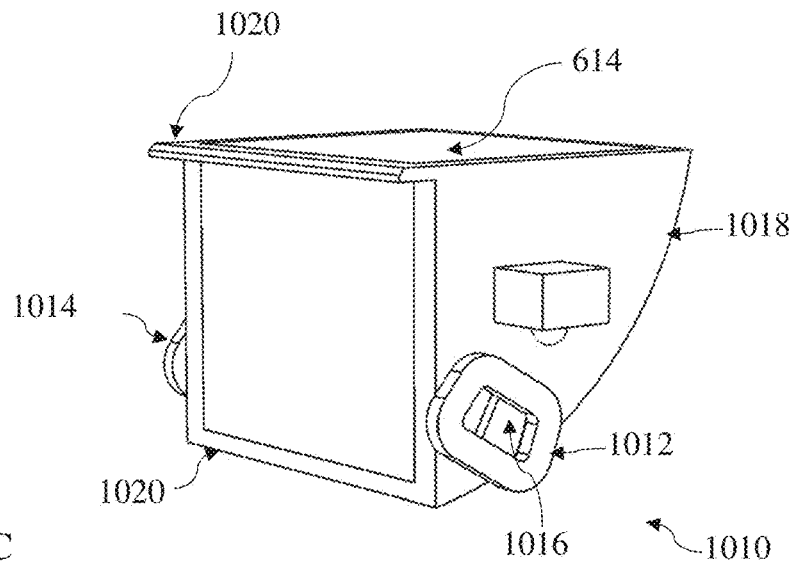
FIG. 10C shows the component shown in FIG. 10A in a second perspective view.

FIG. 10A shows parts of moving part 604 in a side view. FIG. 10B shows the parts of moving part 604 in a first perspective view. FIG. 10C shows the parts of moving part 604 in a second perspective view. SZC 600 includes a first rotation actuator 1010, operational to actuate a rotation of prism 614 around first rotation axis 608. Here, first rotation actuator 1010 is a VCM that includes a first coil 1012 and a second coil 1014 which are both fixedly coupled to moving part 604. First rotation actuator 1010 also includes a first magnet 1016 and a second magnet (not visible) which are both fixedly coupled to prism 614. Prism 614 is included in and fixedly coupled to a prism holder 1018. Prism holder 1018 includes a stray light mask 1020 operational to prevent undesired stray light from reaching image sensor 618.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All patents and/or patent applications mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A folded camera module, comprising:
an optical path folding element (OPFE) for folding light from a first optical path toward a second optical path that is substantially orthogonal to the first optical path,
a lens with a lens optical axis along the second optical path, the lens having an effective focal length EFL in a range of 5-40 mm;
an image sensor;
a module frame surrounding the folded camera module, the module frame having an inner wall pointing towards the OPFE, a module height $H_M$ measured along a direction parallel to the first optical path, a module length $L_M$ measured along a direction parallel to the second optical path and a module width $W_M$ measured along a direction perpendicular to both the first optical path and the second optical path; and
an OPFE actuator including a single voice coil motor (VCM) for rotating the OPFE around a first rotation axis and around a second rotation axis that is perpendicular to the first rotation axis to perform optical image stabilization (OIS) around respectively, a first OIS direction and a second OIS direction,
wherein the OIS is by more than ±1 degrees around each of the first OIS direction and the second OIS direction,
wherein a minimum distance $Y_{Min}$ between the OPFE and the inner wall of the module frame in an extreme rotation OPFE position measured along a direction parallel to the second optical path fulfills $Y_{Min} \leq 2$ mm,
wherein a minimum distance $X_{MIN}$ between the OPFE and the inner wall of the module frame in an extreme rotation OPFE position measured along a direction perpendicular to both the first optical path and the second optical path fulfills $X_{Min} \leq 3$ mm,
wherein a ratio of $Y_{Min}/L_M \leq 0.075$, and
wherein a ratio of $X_{Min}/W_M \leq 0.25$.

2. The folded camera module of claim 1, wherein the rotation of the OPFE around the first rotation axis uses three support positions.

3. The folded camera module of claim 1, wherein the first rotation axis is located within an area that also includes the OPFE.

4. The folded camera module of claim 1, wherein the second rotation axis is located within an area that also includes the OPFE.

5. The folded camera module of claim 1, wherein $Y_{Min}/L_M \leq 0.05$.

6. The folded camera module of claim 1, wherein $X_{Min}/W_M \leq 0.2$.

7. The folded camera module of claim 1, wherein $X_{Min} \leq 2.75$ mm and wherein $Y_{Min} \leq 1.75$ mm.

8. The folded camera module of claim 1, wherein $X_{Min} \leq 2.5$ mm and wherein $Y_{Min} \leq 1.5$ mm.

9. The folded camera module of claim 1, wherein $X_{Min} \leq 2.25$ mm and wherein $Y_{Min} \leq 1.25$ mm.

10. The folded camera module of claim 1, wherein the OIS is by more than ±2 degrees around each of the first OIS direction and the second OIS direction.

11. The folded camera module of claim 1, wherein the OIS is by more than ±3 degrees around each of the first OIS direction and the second OIS direction.

12. The folded camera module of claim 1, wherein the OIS is by more than ±4 degrees around each of the first OIS direction and the second OIS direction.

13. The folded camera module of claim 1, wherein the OIS is by more than ±5 degrees around each of the first OIS direction and the second OIS direction.

14. The folded camera module of claim 1, wherein the OPFE is a prism.

15. The folded camera module of claim 1, wherein $W_M$ in a range of 7.5-15 mm and $L_M$ is in a range of 15-30 mm.

16. The folded camera module of claim 1, wherein $H_M$ is in a range of 4-15 mm.

17. The folded camera module of claim 1, wherein $H_M$ is in a range of 5-10 mm.

18. The folded camera module of claim 1, wherein the OPFE has an OPFE height $H_P$ measured along a direction parallel to the first optical path and an OPFE width $W_P$ measured along a direction perpendicular to both the first optical path and the second optical path, wherein in a zero-rotation OPFE position the OPFE is located at a horizontal distance h-$D_{PH}$ and at a vertical distance v-$D_{PH}$ away from the inner wall of the module frame, and wherein $W_P/h\text{-}D_{PH} > 1.75$ and $H_P/v\text{-}D_{PH} > 1.75$.

19. The folded camera module of claim 18, wherein $W_P/h\text{-}D_{PH} > 2$ and $H_P/v\text{-}D_{PH} > 2$.

20. The folded camera module of claim 18, wherein $W_P/h\text{-}D_{PH} > 2.5$ and $H_P/v\text{-}D_{PH} > 2.5$.

21. The folded camera module of claim 18, wherein $W_P/h\text{-}D_{PH} > 3$ and $H_P/v\text{-}D_{PH} > 3$.

22. The folded camera module of claim 18, wherein $W_P/h\text{-}D_{PH} > 3.25$ and $H_P/v\text{-}D_{PH} > 3.25$.

23. The folded camera module of claim 18, wherein $H_M < H_P + 4$ mm.

24. The folded camera module of claim 18, wherein $H_M < H_P + 2.5$ mm.

25. The folded camera module of claim 18, wherein a ratio $H_P/H_M$ is in a range of 0.7-0.8.

26. The folded camera module of claim 1, wherein $W_P$ is in a range of 3-20 mm.

27. The folded camera module of claim 1, wherein the EFL is in a range of 10-25 mm.

28. The folded camera module of claim 1, wherein the OPFE actuator includes a yaw stage, a pitch stage and a frame, and wherein the yaw stage, the pitch stage and the frame move relatively to each other.

29. The folded camera module of claim 28, wherein the pitch stage moves together with the yaw stage.

30. The folded camera module of claim 28, wherein the yaw stage includes two magnets, and wherein the frame includes two coils, a first coil and a second coil.

31. The folded camera module of claim 28, wherein the frame and the module frame are made of one part.

32. The folded camera module of claim 28, wherein the yaw stage includes a position sensing unit comprising one or more magnets.

33. The folded camera module of claim 28, wherein the pitch stage includes a position sensing unit comprising two or more magnets.

34. The folded camera module of claim 28, wherein the relative movement between the yaw stage, the pitch stage and the frame is enabled by a plurality of ball bearings.

35. The folded camera module of claim 30, wherein for rotating the OPFE around the second rotation axis, a current in the first coil is flowing in an identical direction with a current in the second coil.

36. The folded camera module of claim 30, wherein for rotating the OPFE around the first rotation axis, a current in the first coil is flowing in an opposite direction than a current in the second coil.

37. The folded camera module of claim 1, wherein the folded camera module is included in a mobile device.

38. The folded camera module of claim 37, wherein the mobile device also comprises a Wide camera having a Wide camera field of view $FOV_W$ larger than a folded camera module field of view $FOV_T$.

39. The folded camera module of claim 37, wherein the mobile device also comprises an inertial measurement unit (IMU).

40. The folded camera module of claim 37, wherein the mobile device is a smartphone.

41. The folded camera module of claim 37, wherein the mobile device is a tablet.

\* \* \* \* \*